(12) United States Patent
Dan et al.

(10) Patent No.: US 7,230,731 B2
(45) Date of Patent: Jun. 12, 2007

(54) IMAGE FORMATION APPARATUS AND METHOD WITH PASSWORD ACQUISITION

(75) Inventors: Koji Dan, Kanagawa (JP); Takeshi Fujita, Tokyo (JP); Yasuyuki Igarashi, Kanagawa (JP); Mihoko Inamoto, Kanagawa (JP); Nozomi Sawada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 868 days.

(21) Appl. No.: 10/294,377

(22) Filed: Nov. 14, 2002

(65) Prior Publication Data

US 2003/0107756 A1 Jun. 12, 2003

(30) Foreign Application Priority Data

Nov. 16, 2001 (JP) ............................. 2001-351715
Apr. 10, 2002 (JP) ............................. 2002-108397

(51) Int. Cl.
*G06K 15/00* (2006.01)
*G03G 21/00* (2006.01)

(52) U.S. Cl. ..................... 358/1.14; 399/366; 705/57
(58) Field of Classification Search ................ 399/366; 705/51, 57; 358/1.6, 3.28, 1.14
See application file for complete search history.

(56) References Cited

U.S. PATENT DOCUMENTS

| | | | | |
|---|---|---|---|---|
| 4,843,571 A | * | 6/1989 | Notermans et al. | ........ 358/1.18 |
| 5,041,918 A | | 8/1991 | Ishida et al. | |
| 5,402,250 A | | 3/1995 | Ishida et al. | |
| 5,465,326 A | | 11/1995 | Sawada | |
| 5,537,221 A | | 7/1996 | Sawada | |
| 5,580,046 A | * | 12/1996 | Beaufort et al. | ........... 271/3.16 |
| 5,633,730 A | | 5/1997 | Sawada et al. | |
| 5,642,199 A | * | 6/1997 | Ukai et al. | .................. 358/296 |
| 5,737,663 A | * | 4/1998 | Handa et al. | ................. 399/50 |
| 5,999,707 A | * | 12/1999 | Taniguchi et al. | ......... 358/1.15 |
| 6,195,698 B1 | * | 2/2001 | Lillibridge et al. | ......... 709/225 |
| 6,307,640 B1 | * | 10/2001 | Motegi | ....................... 358/1.14 |
| 6,606,163 B1 | * | 8/2003 | Suzuki et al. | ............... 358/1.15 |
| 6,618,166 B1 | * | 9/2003 | Suzue | ........................ 358/1.15 |
| 6,864,991 B1 | * | 3/2005 | Takahashi | .................. 358/1.15 |
| 2001/0000360 A1 | | 4/2001 | Shibata | |
| 2003/0051061 A1 | * | 3/2003 | Hank et al. | ................. 709/250 |
| 2003/0093675 A1 | * | 5/2003 | Hibino et al. | ............... 713/168 |

FOREIGN PATENT DOCUMENTS

| | | | |
|---|---|---|---|
| EP | 1122635 A | | 8/2001 |
| JP | 363119365 | * | 5/1988 |
| JP | 409120347 | * | 5/1997 |
| JP | 09152948 | * | 6/1997 |
| JP | 02001282477 A | * | 3/2000 |

OTHER PUBLICATIONS

U.S. Application No. 023707 filed Dec. 21, 2001.

* cited by examiner

*Primary Examiner*—Jerome Grant
(74) *Attorney, Agent, or Firm*—Cooper & Dunham LLP

(57) ABSTRACT

In an image formation apparatus that prints out print data to a sheet, a print data storage unit stores the print data, a printing unit conducts print processing to the print data stored in the print data storage unit, a password acquisition unit acquires a password for the print data from an outside of the apparatus, and a printing control unit allows the printing unit to start the print processing of the print data under condition that the password acquisition unit acquires the password for the print data.

13 Claims, 26 Drawing Sheets

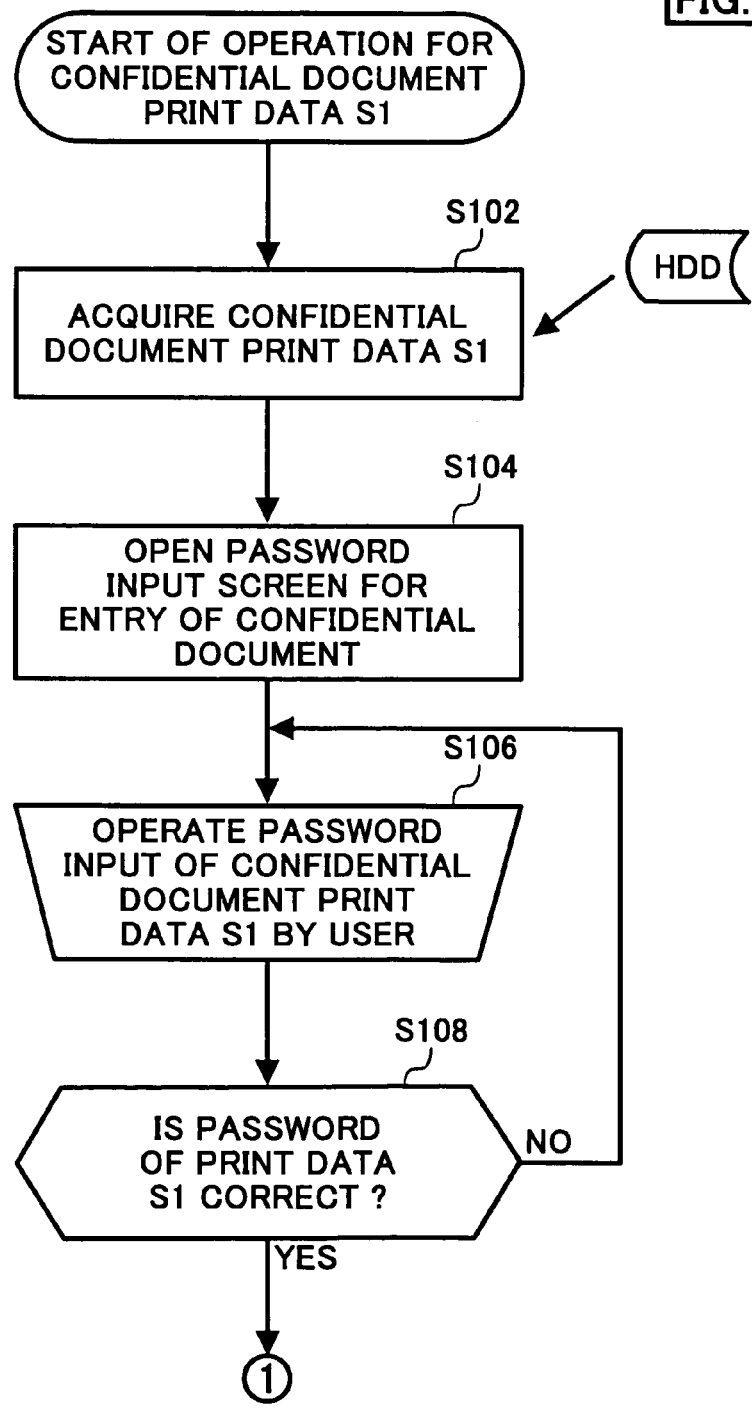

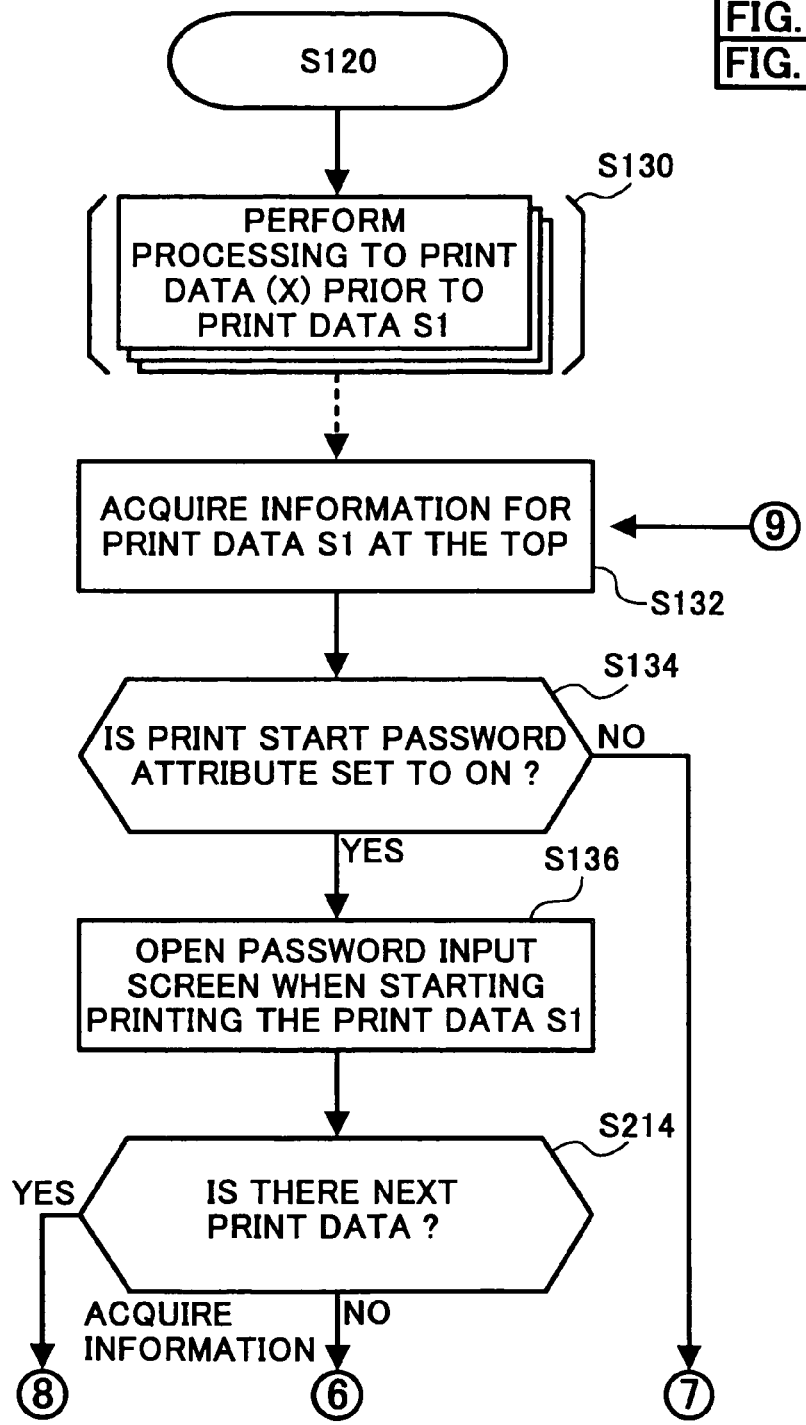

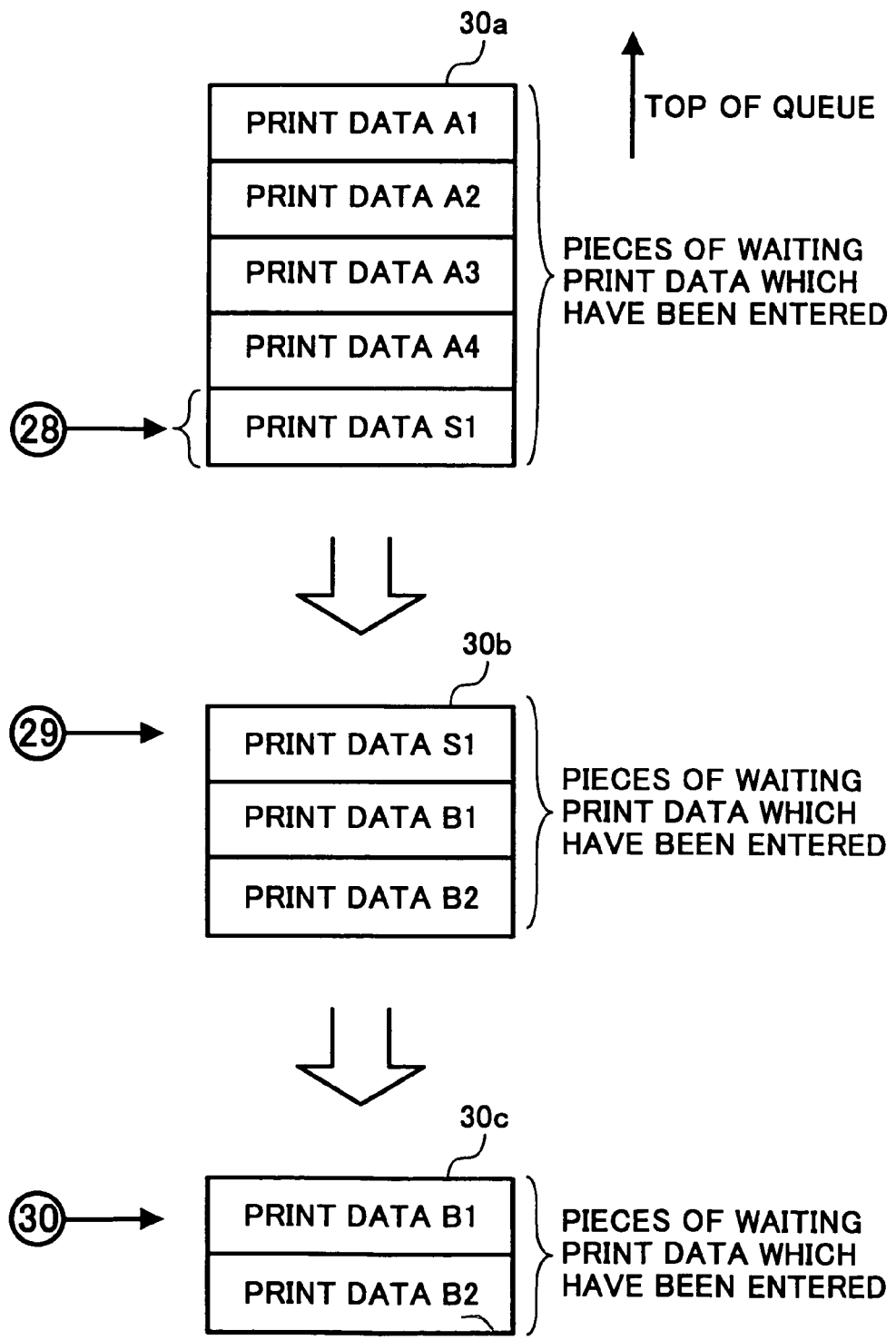

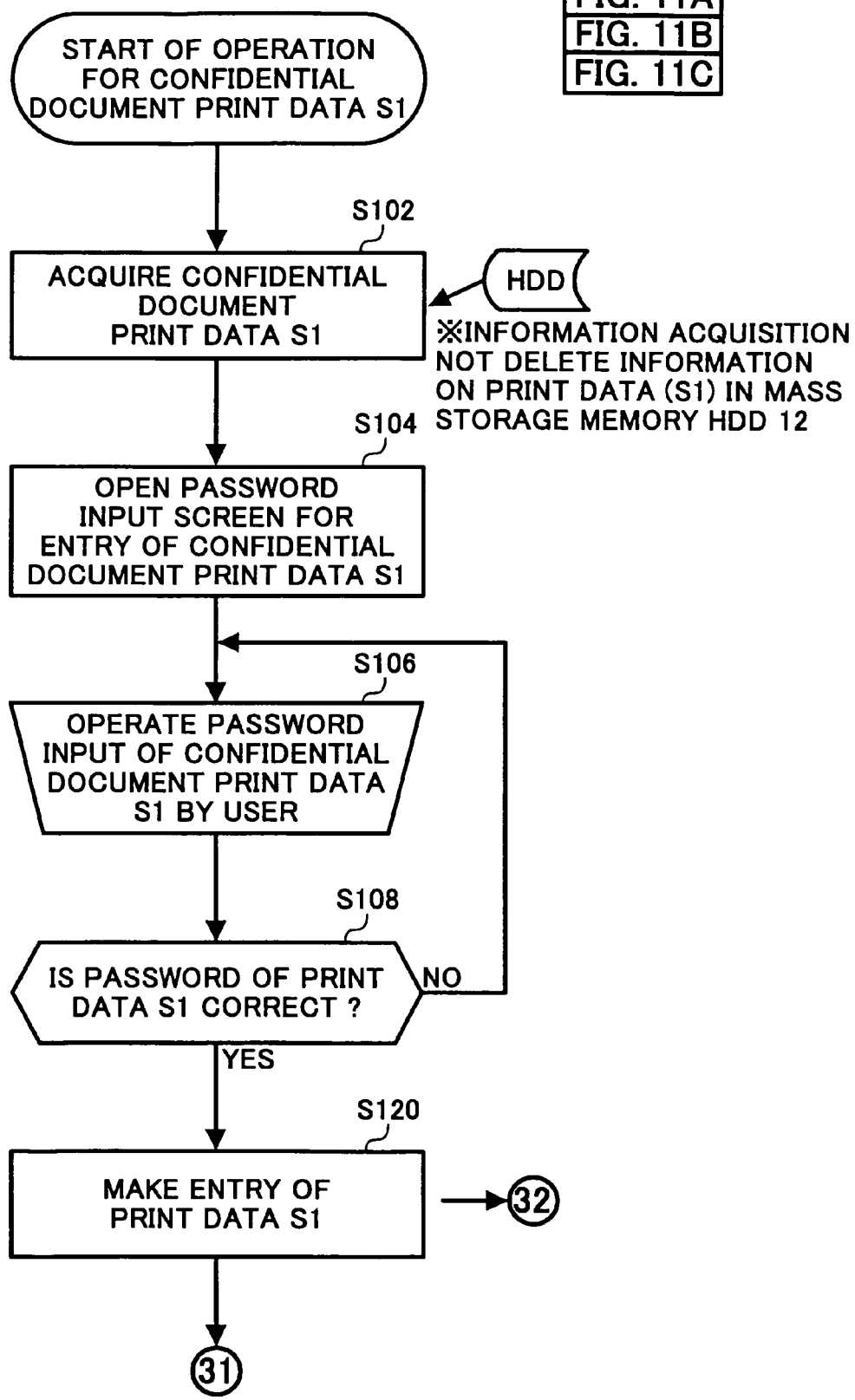

IMAGE FORMATION APPARATUS AND METHOD WITH PASSWORD ACQUISITION

BACKGROUND OF THE INVENTION

1) Field of the Invention

The present invention relates to an image formation apparatus for and method of printing print data.

2) Description of the Related Art

Recently, a usage pattern such that one printer is commonly used by a plurality of users through a network has been increased. In such a usage pattern, if a document such as a confidential document is to be confidentially printed, a user has to take care of a printing timing by, for example, checking that no other users are present around the printer. To solve this case, there has been a system in which a dedicated password is set to a document using a copy server function, the document is transferred to a hard disk drive of a printer, the password is input through the operation of an input panel of the printer to enter a queue for managing a printing order, and the document is output after checking the password.

However, according to a conventional image formation apparatus, if a user inputs a password of print data for a confidential document for an entry in a queue, then the print data for the confidential document is handled in the same manner as ordinary print data from that time forward. Therefore, in order to prevent a print from being seen by any other users, the user must wait for complete of the print in front of the apparatus no matter how long it takes to print the print data for the confidential document.

SUMMARY OF THE INVENTION

It is an object of this invention to provide an image formation apparatus capable of lessening the burden imposed on a user in printing data for a confidential document.

The image formation apparatus according to one aspect of this invention comprises a print data storage unit that stores print data, a printing unit that conducts print processing to the print data stored in the print data storage unit, a password acquisition unit that acquires a password for the print data from an outside of the apparatus, and a printing control unit that allows the printing unit to start the print processing of the print data under condition that the password acquisition unit acquires the password for the print data.

The image formation method according to another aspect of this invention comprises steps of conducting print processing to print data stored in a print data storage unit that stores the print data, acquiring a password for the print data from an outside, and starting the print processing of the print data under condition that the password for the print data is acquired.

These and other objects, features and advantages of the present invention are specifically set forth in or will become apparent from the following detailed descriptions of the invention when read in conjunction with the accompanying drawings.

DETAILED DESCRIPTIONS

Embodiments of the image formation apparatus and the image formation method according to the present invention will be explained in detail below with reference to the accompanying drawings.

A first embodiment of this invention will be explained below.

Figure 1:
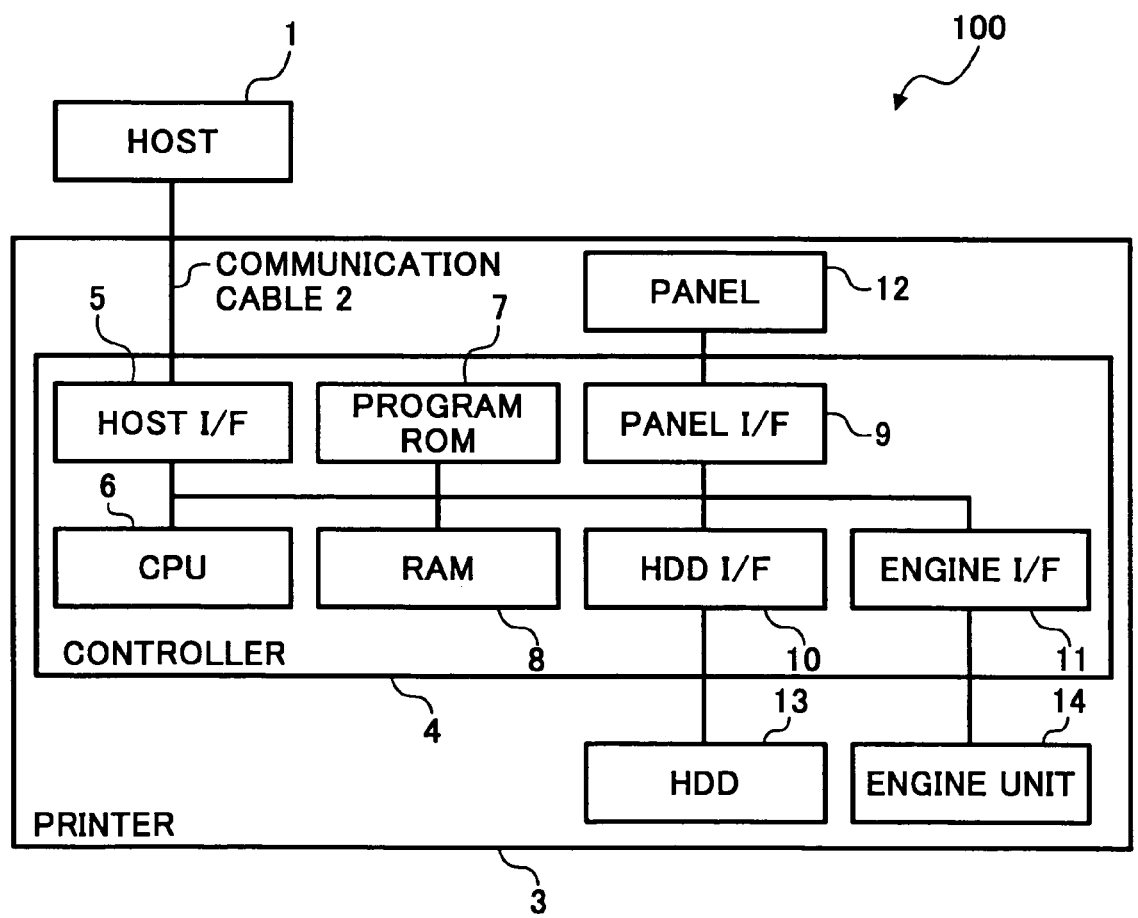
FIG. 1 is an overall block diagram showing the configuration of a print system 100 that includes a laser printer 3 according to a first embodiment of this invention.

FIG. 1 is an overall block diagram showing the configuration of a print system 100 that includes a laser printer 3 serving as an image formation apparatus according to the first embodiment of the present invention. The print system 100 also includes a host 1 that functions as a host apparatus for the laser printer. The host 1 transmits job data to the laser printer 3 through a communication cable 2 physically connected to the host 1. The job data means an instruction issued to the printer 3, and the job data includes a print instruction and print data to be printed. The laser printer 3 prints the print data based on the print instruction.

The laser printer 3 includes a panel 12, a hard disk (HDD) 13, an engine unit 14, and a controller 4 that controls these components.

The panel 12 functions as a touch panel that receives an input from a user, and also functions as a display that displays information to be notified to the user.

The HDD 13 is a mass storage nonvolatile memory that holds accumulated print data.

The engine unit 14 generates and develops an electrostatic latent image on a photoreceptor, not shown, in response to a video signal and a control signal from the controller 4, feeds a transfer sheet by a paper feed section, not shown, and transfers and fixes the developed image onto the transfer sheet, thereby generating an image on a print sheet. That is, the engine unit 14 explained in the "Background of the Invention" part constitutes printing unit according to the present invention.

The controller 4 includes a host interface (I/F) 5, a CPU 6, a program ROM 7, a RAM 8, a panel interface (I/F) 9, an HDD interface (I/F) 10, and an engine interface (I/F) 11.

The controller 4 is a control mechanism that receives and expands a job transmitted from the host 1, makes an entry of the resultant job in a FIFO queue for print data ("print data FIFO queue") for management of the print data on the RAM 8, converts the print data into video data from the top of the print data FIFO queue, and finally outputs the converted video data to the engine unit 14.

The host I/F 5 is an interface used to receive job data from the host 1 to the printer 3. The CPU 6 processes data from the host 1 in accordance with the program ROM 7. The program ROM 7 stores main programs for managing data in the controller 4 and controlling peripheral modules such as the panel 12, the HDD 13, and the engine unit 14.

The RAM 8 is used as various storage regions including a work memory used when the CPU 6 processes the data, the print data FIFO queue that manages the data from the host 1 for each print data and temporarily stores the data, a page buffer that manages the data for each page and temporarily stores the data, a bitmap memory that converts the data stored in the page buffer into an actual print pattern and stores print data, and the like.

The panel I/F 9 is an interface with the panel 12. The HDD I/F 10 is an interface with the HDD 13. The engine I/F 11 is an interface to transmit and receive various signals including a control signal from the controller 4 to the engine unit 14, a status signal from the engine unit 14 to the controller 4, and a video signal from the controller 4.

Figure 2:
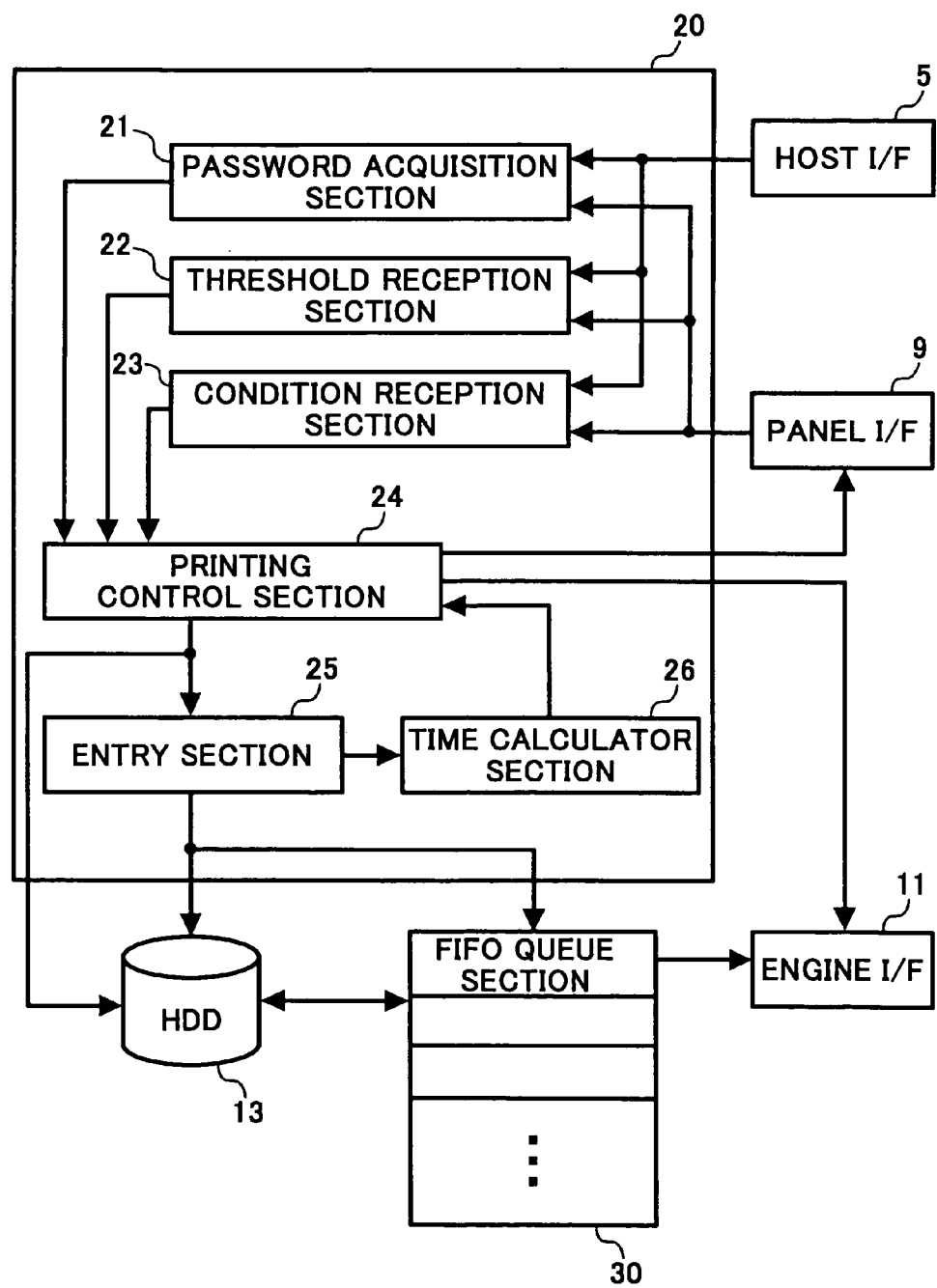
FIG. 2 is a functional block diagram showing the functional configuration of the printer 3.

FIG. 2 is a functional block diagram showing the functional configuration of the printer 3. By referring to FIG. 2, a processing section 20 that performs characteristic processing according to the first embodiment will be explained below. The processing section 20 includes an entry section 25, a printing control section 24, a time calculation section 26, a password acquisition section 21, a threshold reception section 22, and a condition reception section 23.

The entry section 25 extracts print data from the HDD 13, and stores the extracted print data in a print data FIFO queue section 30. The entry section 25 also returns the print data from the print data FIFO queue section 30 to the HDD 13.

The printing control section 24 controls the processing of the engine unit 14. The printing control section 24 also deletes print data or the like that has entered the print data FIFO queue section 30 through the entry section 25. That is, the printing control section 24 constitutes a print data deletion unit according to the present invention.

The time calculation section 26 calculates a waiting time required since the entry section 25 makes an entry of specified print data in the print data FIFO queue section 30 from the HDD 13 until the engine unit 14 starts print processing of this print data.

The password acquisition section 21 acquires a password input by a user through the panel I/F 9 and the host I/F 5. The password acquired here is required to start printing of the print data entered in the print data FIFO queue section 30. It is noted that an entry password, different from the password, for making an entry of data in the print data FIFO queue section 30 may be acquired. The password used to start printing is simply referred to as "password" hereinafter. The threshold reception section 22 receives the designation of the threshold of the waiting time input by the user through the panel I/F 9 and the host I/F 5. The condition reception section 23 receives an instruction as to whether it is necessary to acquire a password for print data as a target of print processing and an instruction to cancel printing, as conditions required for starting the print processing, through the panel I/F 9 and the host I/F 5. That is, the condition reception section constitutes a condition reception unit and a cancellation reception unit according to the present invention.

Figure 3B:
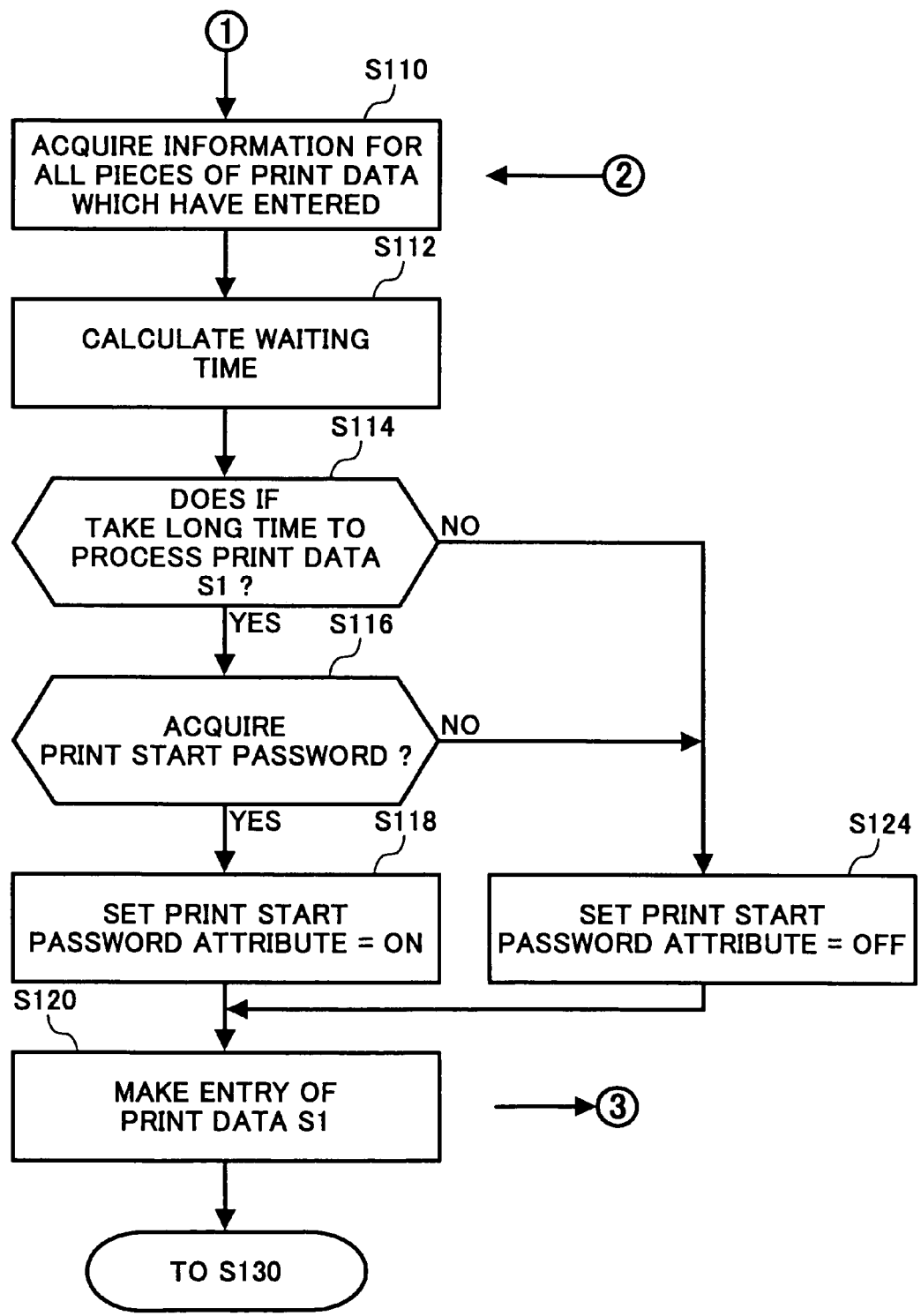
FIG. 3 is a flow chart showing a processing flow if a confidential document is printed using the printer 3 according to the first embodiment.
Figure 3C:
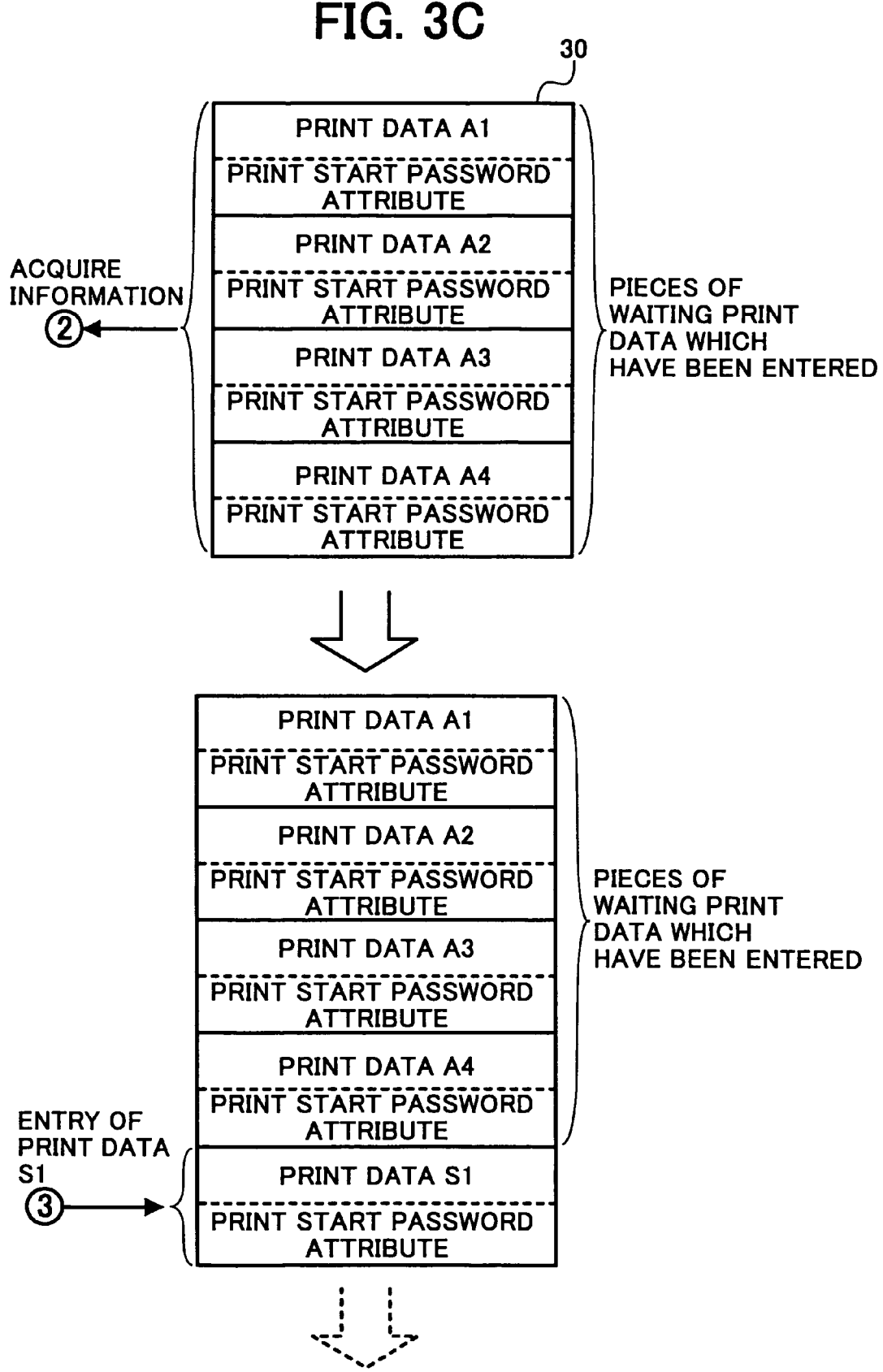
Figure 4A:
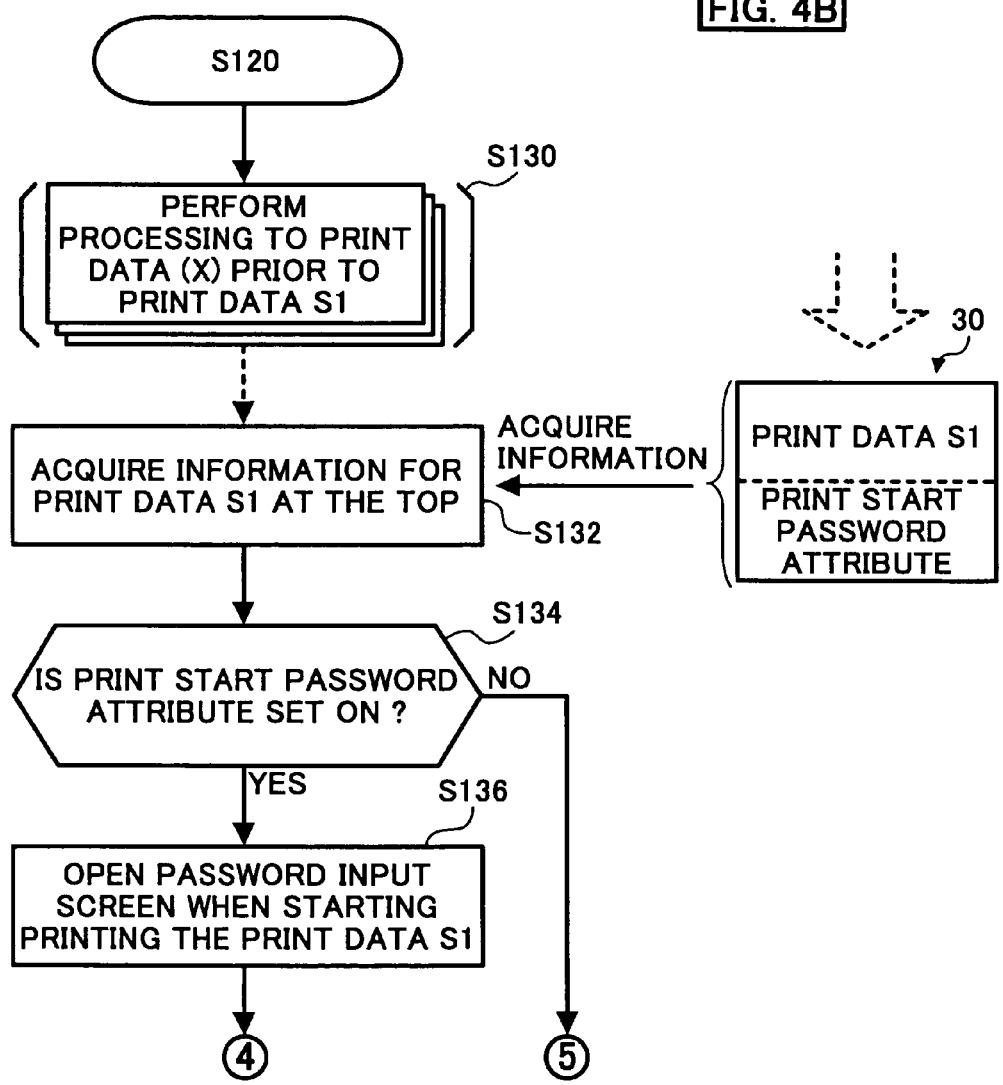
FIG. 4 is a flow chart showing a processing flow if a confidential document is printed using the printer 3 according to the first embodiment.
Figure 4B:
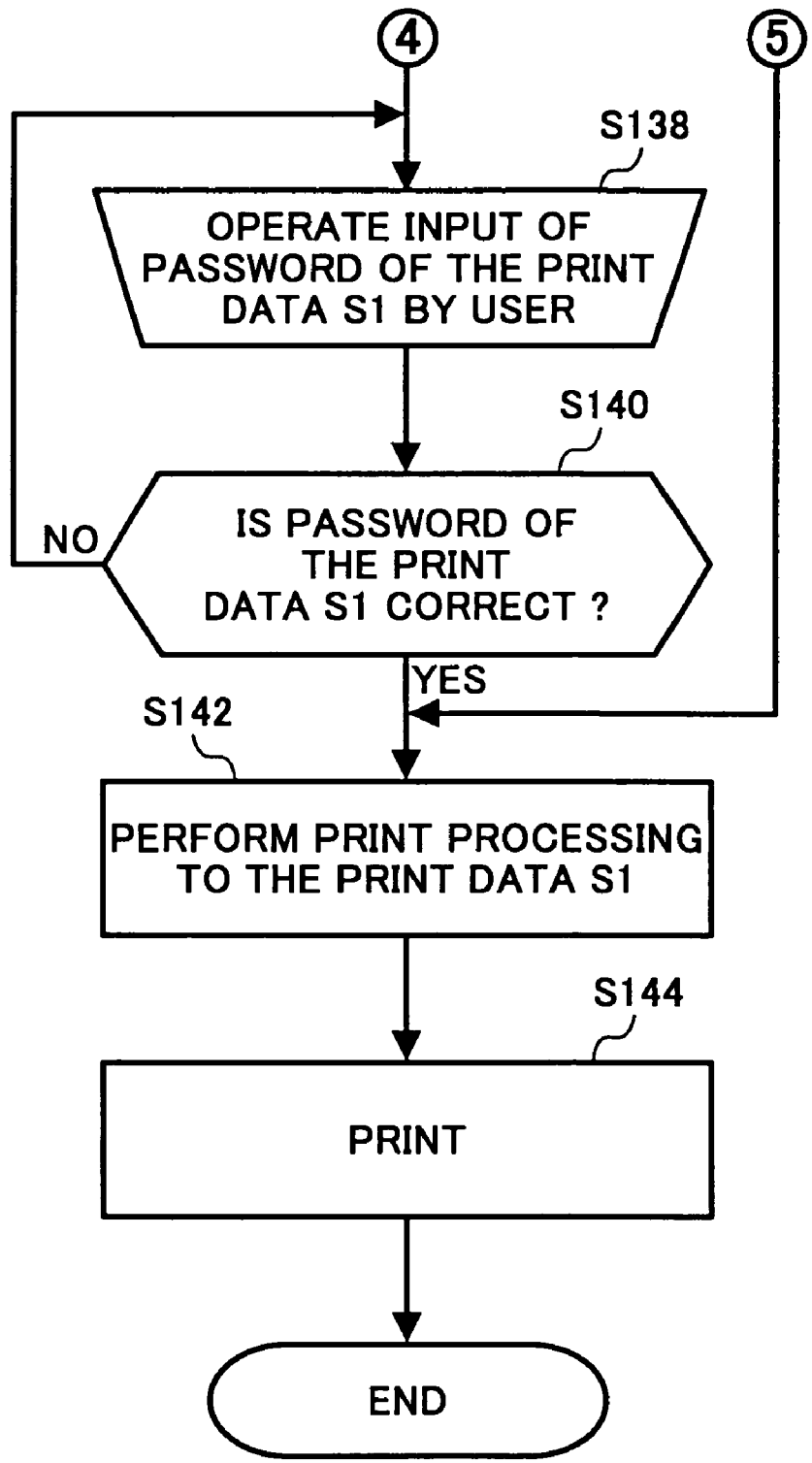

FIG. 3 and FIG. 4 are flow charts that respectively show processing flows when a confidential document is printed using the printer 3 according to the first embodiment of the present invention. In addition, FIG. 3 and FIG. 4 schematically show print data arranged in the print data FIFO queue section 30 at predetermined processing steps.

If a user operates the host 1 to generate print data S1 of a confidential document and inputs a password, the host 1 transmits job data including the print data and the password to the printer 3. Upon receiving the job data, the printer 3 expands the job data, and accumulates the print data of the confidential document and the password in the HDD 13 (step S102).

Thereafter, the user goes to a location at which the printer 3 to which the confidential document print data is transmitted, is disposed, and operates the panel 12 to make an instruction that the user inputs an entry password. Upon receiving the instruction, the printer 3 opens an input screen of an entry password on the display screen of the panel 12 (step S104). When the user then inputs the entry password set when transmitting the confidential print data on the panel 12, the password acquisition section 21 acquires the entry password (step S106).

The printing control section 24 detects the print data corresponding to the same entry password as that acquired by the password acquisition section 21, from pieces of the print data stored in the HDD 13. If the printing control section 24 does not detect the print data corresponding to the entry password acquired by the password acquisition section 21 (No at step S108), the printing control section 24 displays a screen for prompting the user to enter an entry password again on the panel 12.

On the other hand, if detecting the print data corresponding to the password for entry acquired by the password acquisition section 21 (Yes at step S108), the printing control section 24 acquires information for all pieces of print data entered in the print data FIFO queue section 30 through the entry section 25 (step S110). Specifically, the printing control section 24 acquires information for print data A1, print data A2, print data A3, and print data A4.

The time calculation section 26 calculates a time required to complete all print processing when the engine unit 14 conducts the print processing to each of the print data A1 to A4 (step S112). It is noted that the time calculated by the time calculation section 26 is a time, i.e., a waiting time, required until print processing of print data S1 entered in the FIFO queue section 30 after the print data A4, is started.

A method of calculating the waiting time by the time calculation section 26 at step S112 will be explained below. The time calculation section 26 calculates waiting time for the print data S1 based on the total number of sheets to which the print data A1 to A4, entered in the print data FIFO queue section 30 prior to the print data S1 among the pieces of print data stored in the print data FIFO queue section 30, are output.

The time calculation section 26 also calculates waiting time for the print data S1 based on the number of jobs of the print data A1 to A4, entered in the print data FIFO queue section 30 prior to the print data S1 among the pieces of print data stored in the print data FIFO queue section 30. Further, the time calculation section 26 calculates waiting time for the print data S1 based on the data amount of the print data A1 to A4, entered in the print data FIFO queue section 30 prior to the print data S1 among the pieces of print data stored in the print data FIFO queue section 30.

The time calculation section 26 calculates waiting time for the print data S1 based on the size of sheets to which the print data A1 to A4, entered in the print data FIFO queue section 30 prior to the print data S1 among the pieces of print data stored in the print data FIFO queue section 30, are output. In the embodiment, the waiting time is totally calculated based on the total number of sheets, the data amount, and the size of the sheets to which the print data A1 to A4 are to be output.

For example, the time calculation section 26 acquires the number of pages of the print data entered in the print data FIFO queue section 30. If a plurality of print data are entered in the print data FIFO queue section 30, the time calculation section 26 acquires the number of pages to be printed for all pieces of the entered print data. The time calculation section 26 calculates a time, i.e., a waiting time required to completely output all the pieces of print data based on the total number of pages of the acquired print data and the engine specification (ppm) of the engine unit 14. To be more specific, if the total number of pages is N and the engine specification is M (ppm), the waiting time is N/M (minute).

The printing control section 24 displays a result of calculation, i.e., the waiting time on the panel 12, and prompts the user to give an instruction as to whether the user will wait for the completion of print if the waiting time calculated by the time calculation section 26 is equal to or longer than the predetermined time (Yes at step S114). The predetermined time may be, for example, five minutes or may be set in advance.

In other words, the predetermined time mentioned herein corresponds to a threshold of the waiting time according to the present invention and may be changed through an entry by the user. If the user receives the threshold of the waiting time through the panel 12, the threshold reception section 22 receives the threshold of the waiting time. The printing control section 24 compares the time calculated by the time calculation section 26 with the threshold of the waiting time received by the threshold reception section 22. The user can be thus freely set the threshold of waiting time.

The user can also designate, as a condition for starting the print processing of the printing unit, whether it is necessary to acquire a password for print data as a target for the print processing. If the user inputs the designation as to whether it is necessary to acquire the password through the panel 12, the condition reception section 23 receives the designation as to whether it is necessary to acquire the password. If the designation to the effect that it is necessary to acquire the password is received, the printing control section 24 makes a setting so as to start print processing of the print data under the condition that the password for the print data is acquired.

Specifically, if it takes long time until the print processing of the print data S1 is started and the user cannot wait for the start of the print processing, the user inputs designation such that it is necessary to acquire a password and the password required at the time of starting the printing ("print start password"), into the panel 12. At this moment, the password acquisition section 21 of the printer 3 acquires the password input by the user as the print start password (Yes at step S116). The printing control section 24 sets an "attribute of print start password ("print start password attribute")" for the print data S1 to ON (step S118). The entry section 25 makes an entry of the print data S1 in which the attribute of print start password is set to ON, in the print data FIFO queue section 30 (step S120). It is noted that the print data S1 is entered in the end of the array of the print data FIFO queue section 30, i.e., next to the print data A4.

The print start password means a password that a user is to input when the engine unit 14 starts the print processing. In addition, the print start password attribute means information indicating whether a print start password is necessary when the engine unit 14 starts the print processing. Namely, if the print start password attribute is set to ON, the print processing of print data corresponding to this print start password attribute is started under the condition that the print start password is input by the user. The print start password mentioned here corresponds to the password according to the present invention.

On the other hand, if it does not take long time until the print processing of the print data S1 is started, i.e., the calculated waiting time is shorter than the threshold set in advance (No at step S114) and the user determines that he/she wants to wait for the start of the printing, the user does not need to input a password. In this case, since the password acquisition section 21 does not acquire any password (No at step S116), the password acquisition section 21 sets the "print start password attribute" of the print data S1 to OFF (step S124). The entry section 25 makes an entry of the print data S1 in which the print start password attribute is set to OFF in the print data FIFO queue section 30 (step S120).

As can be seen, the acquisition of the print start password of print data can be set as a condition for starting print processing of the print data only if calculated waiting time is equal to or longer than a predetermined time, i.e., equal to or longer than the threshold of the waiting time.

The engine unit 14 then starts the print processing of the print data entered in the print data FIFO queue section 30. When the print processing of all pieces of print data A1 to A4 entered in the print data FIFO queue section 30 prior to the print data S1, i.e., all pieces of print data A1 to A4 arranged prior to the print data S1, are completed (step S130), the printing control section 24 acquires information for the print data S1 positioned at the top of the print data FIFO queue section 30 (step S132). If the printing control section 24 refers to the print start password attribute of the print data S1 and determines that the attribute is OFF (No at step S134), the engine unit 14 instantly conducts the print processing of the print data S1 (step S142). An image corresponding to the print data S1 is then printed on a print sheet (step S144).

On the other hand, if it is determined that the print start password attribute of the print data S1 is ON (Yes at step S134), printing control section 24 displays the password input screen on the panel 12 (step S136). If the password set when the confidential document print data is transmitted, is input by the user (step S138), the password acquisition section 21 acquires the password as a print start password. When a correct password is input (Yes at step 140), the engine unit 14 starts the print processing of the print data S1 (step S142), and an image corresponding to the print data S1 is printed on a print sheet (step S144).

If the correct password is not input at step S140, the engine unit 14 does not start the print processing (No at step S144).

As can be seen, there is a case where entered waiting print data already exists at the time when print data of a confidential document accumulated in the HDD 13 is entered in the print data FIFO queue section 30 so as to conduct print processing of the print data and it takes quite a time until print processing of the print data for the target confidential document is executed. Even in such a case, it is necessary to input a password again on the panel 12 just before the print processing starts. It is, therefore, possible to prevent the print data from being inadvertently output. In addition, the image is not printed out unless the password is input, and therefore the user does not need to attend the printer 3 to wait for printing of the confidential document.

A second embodiment of this invention will be explained below.

Figure 5:
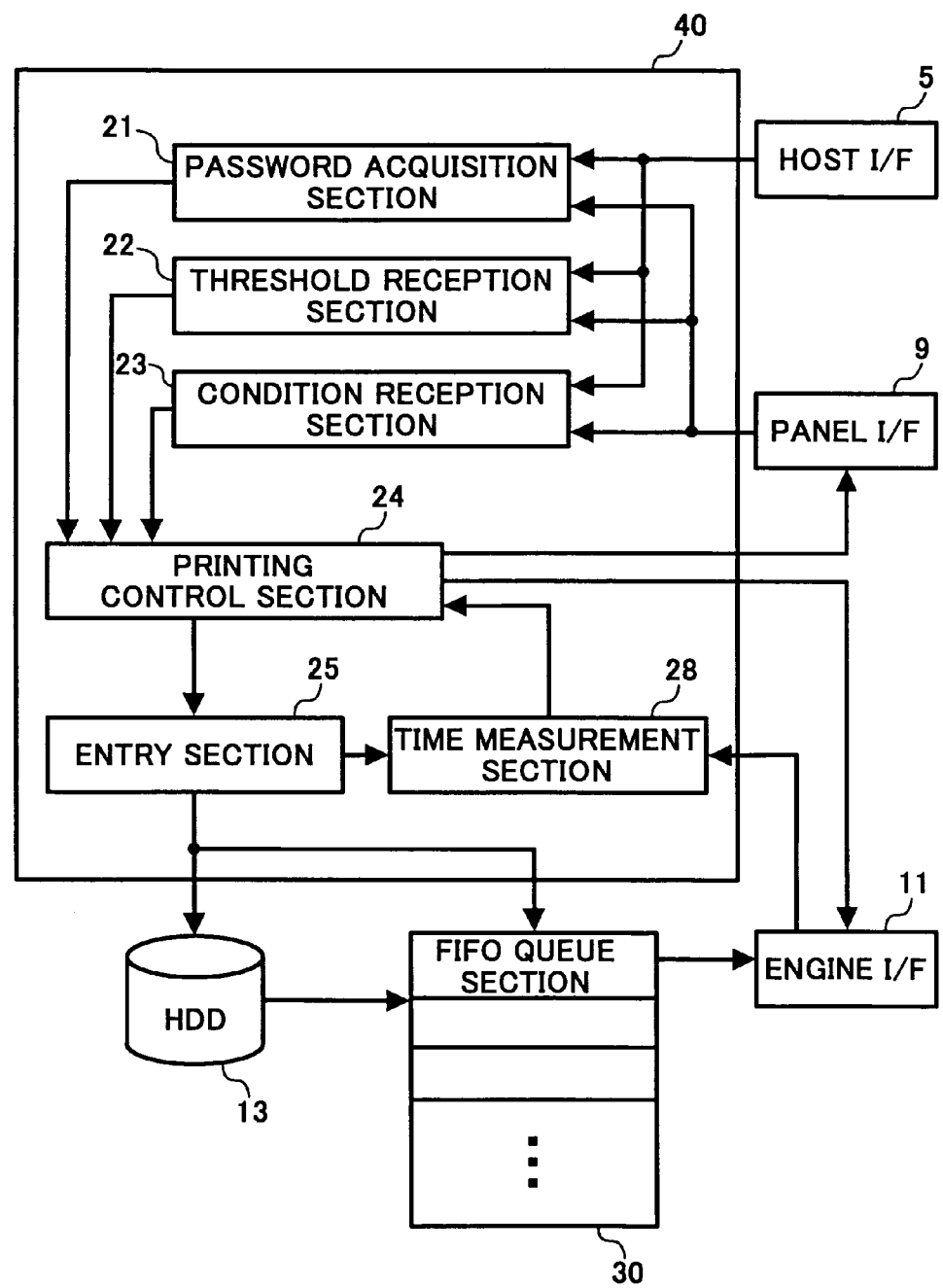
FIG. 5 is a functional block diagram showing the functional configuration of a printer 3 according to a second embodiment of this invention.

FIG. 5 is a functional block diagram showing the functional configuration of a printer 3 according to the second embodiment. By referring to FIG. 5, a processing section 40 that performs characteristic processing according to the second embodiment will be explained below. The processing section 40 includes a time measurement section 28 instead of the time calculation section 26 in the processing section 20 of FIG. 2. The time measurement section 28 measures actual measurement passage time passing since the print data S1 is entered in the print data FIFO queue section 30 until the print data S1 reaches the top of the print data FIFO queue section 30. That is, the time measurement section 28 measures the time that passes since the entry of the print data S1 until the completion of print processing of print data entered in the print data FIFO queue section 30 just before the print data S1. Based on this actual measurement passage time, it is determined whether to require a print start password. The printer 3 of the second embodiment differs in this respect from the printer 3 of the first embodiment.

For example, if the print data A1 to A4 have already been entered in the print data FIFO queue section 30 when the printer data S1 is entered therein as explained in the first embodiment, then the time measurement section 28 measures a time required for an engine unit 14 to conduct print processing of the print data A1 to A4 and to thereby complete the entire print processing, as actual measurement time.

The printer 3 of the second embodiment can determine whether it is necessary to input a print start password as a condition for starting print processing of print data based on the actual measurement passage time measured by the time measurement section 28 in place of the waiting time calculated by the time calculation section 26 in the first embodiment.

It is noted that the rest of the configuration and the other functions of the printer 3 in the second embodiment are the same as those of the printer 3 in the first embodiment.

A third embodiment of this invention will be explained below.

Figure 6B:
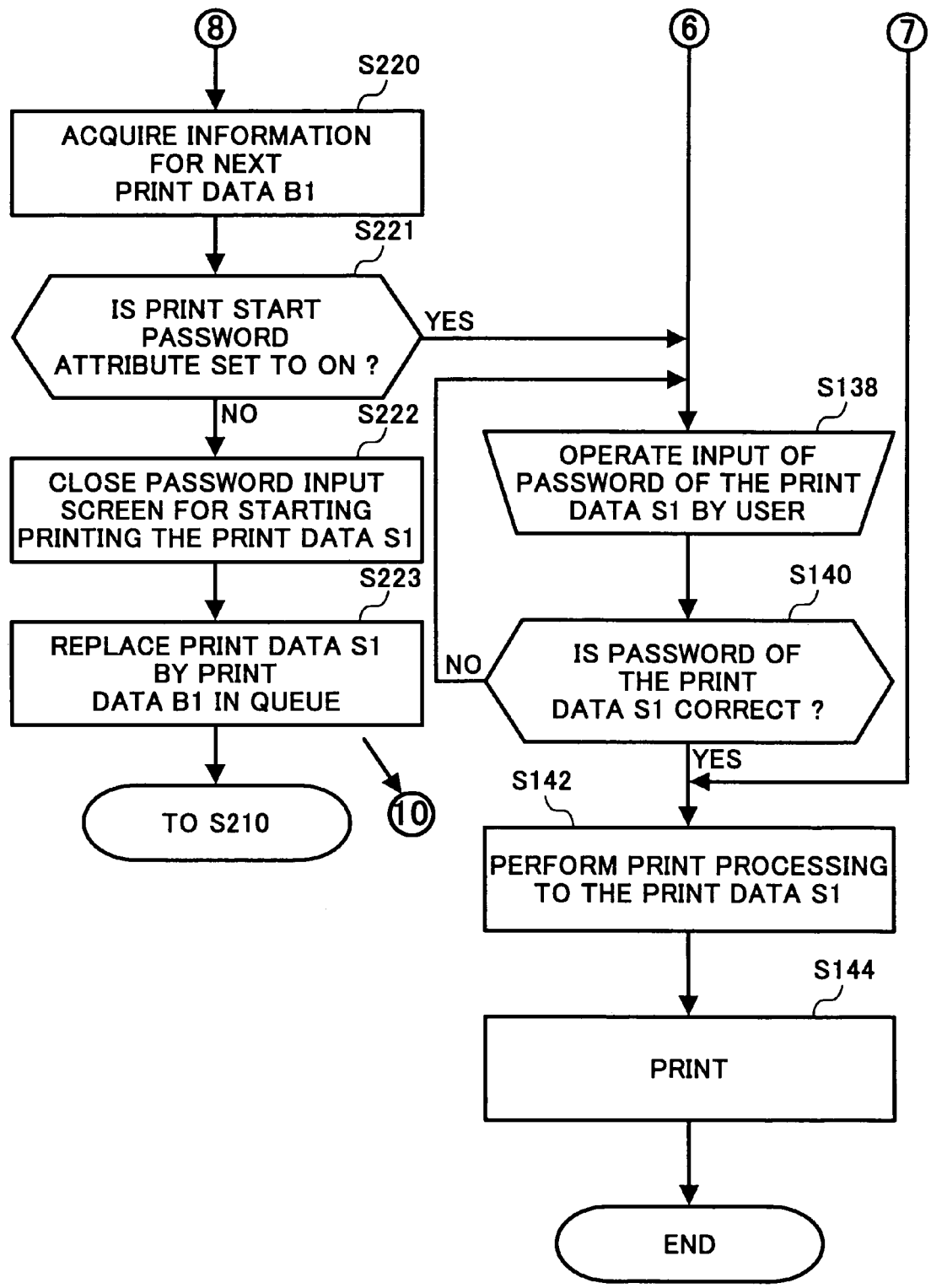
FIG. 6 is a flow chart showing a control flow when a confidential document is printed using the printer 3 according to a third embodiment of this invention.
Figure 6C:
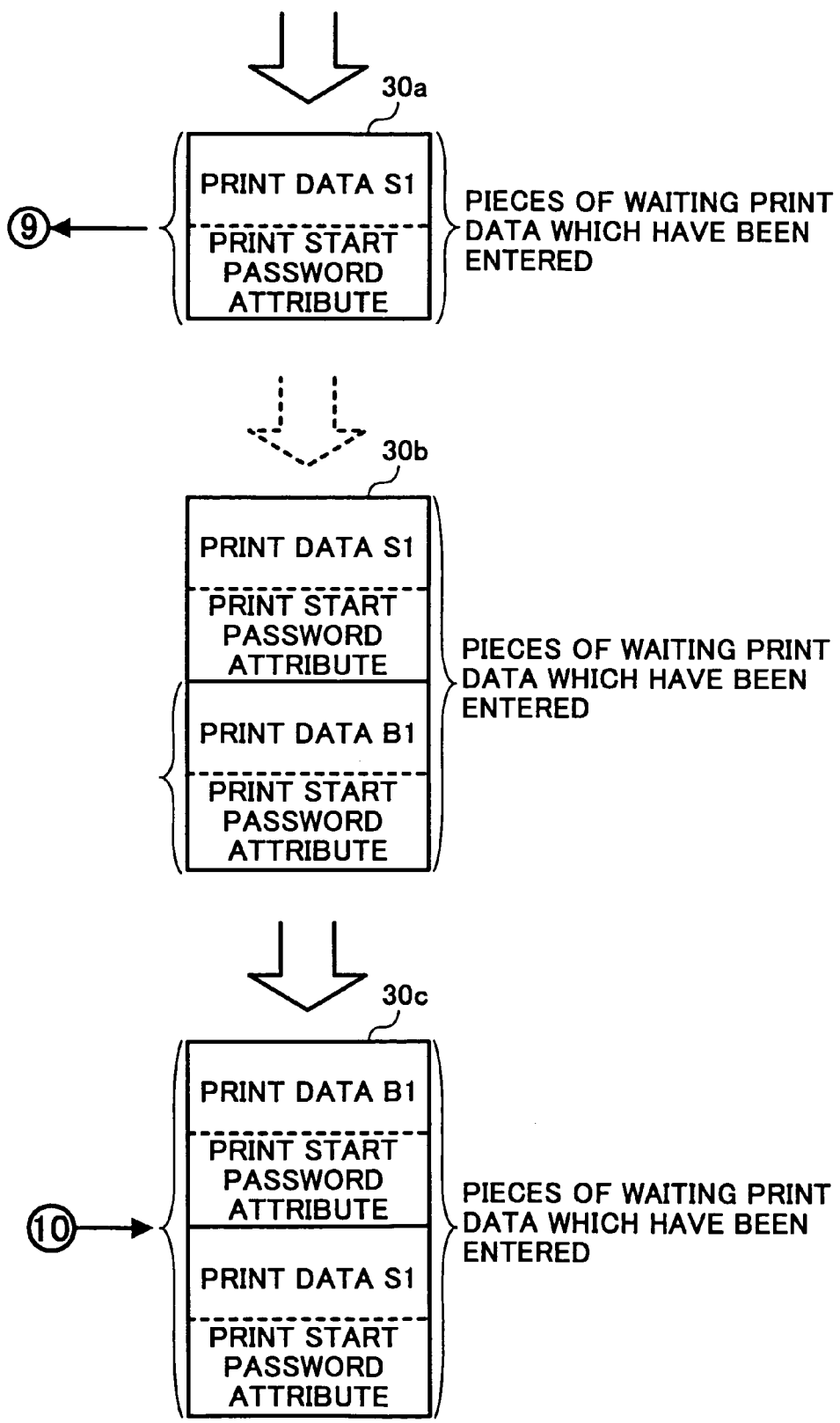
Figure 7A:
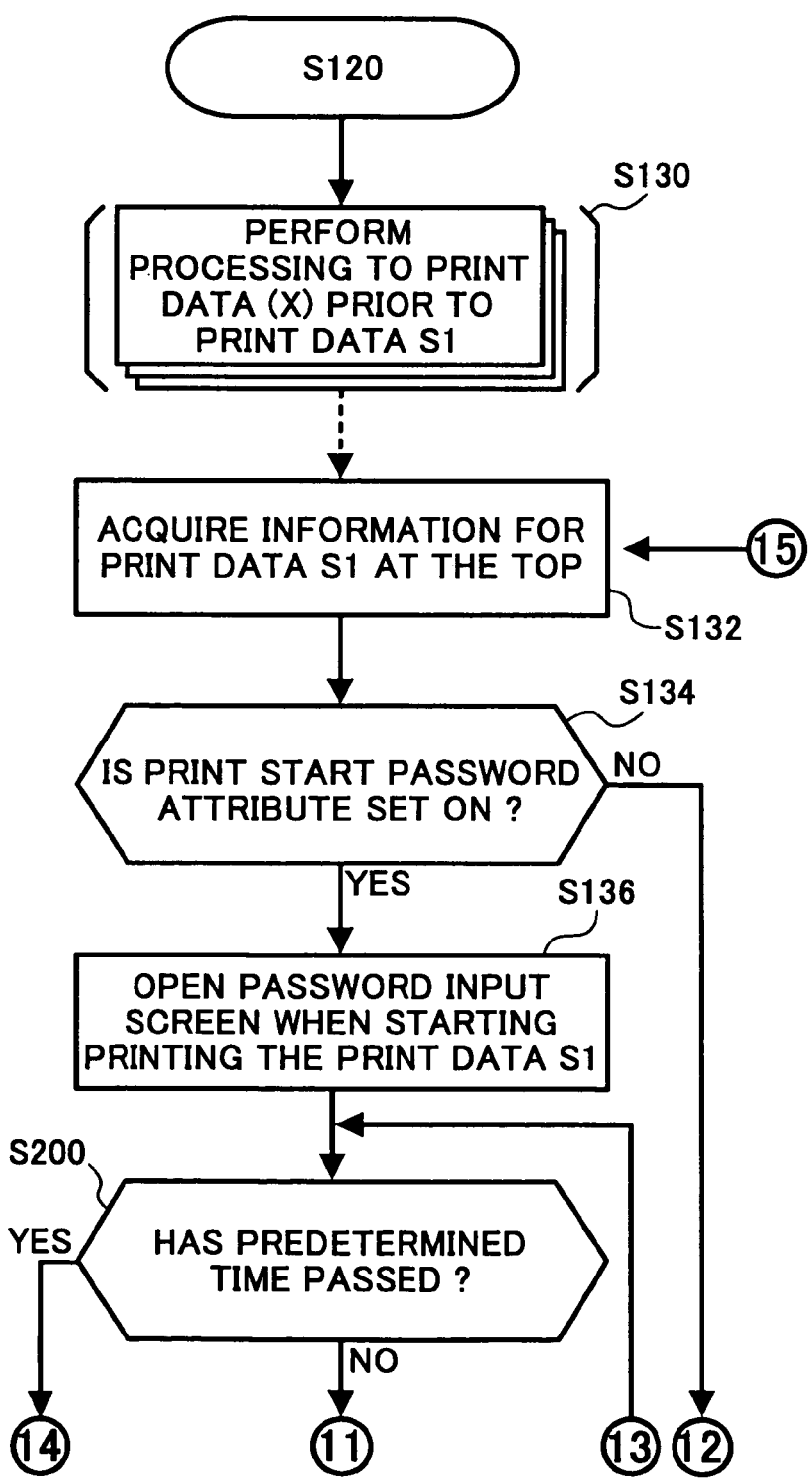
FIG. 7 is a flow chart showing a control flow when a confidential document is printed using a printer 3 according to a fourth embodiment of this invention.
Figure 7B:
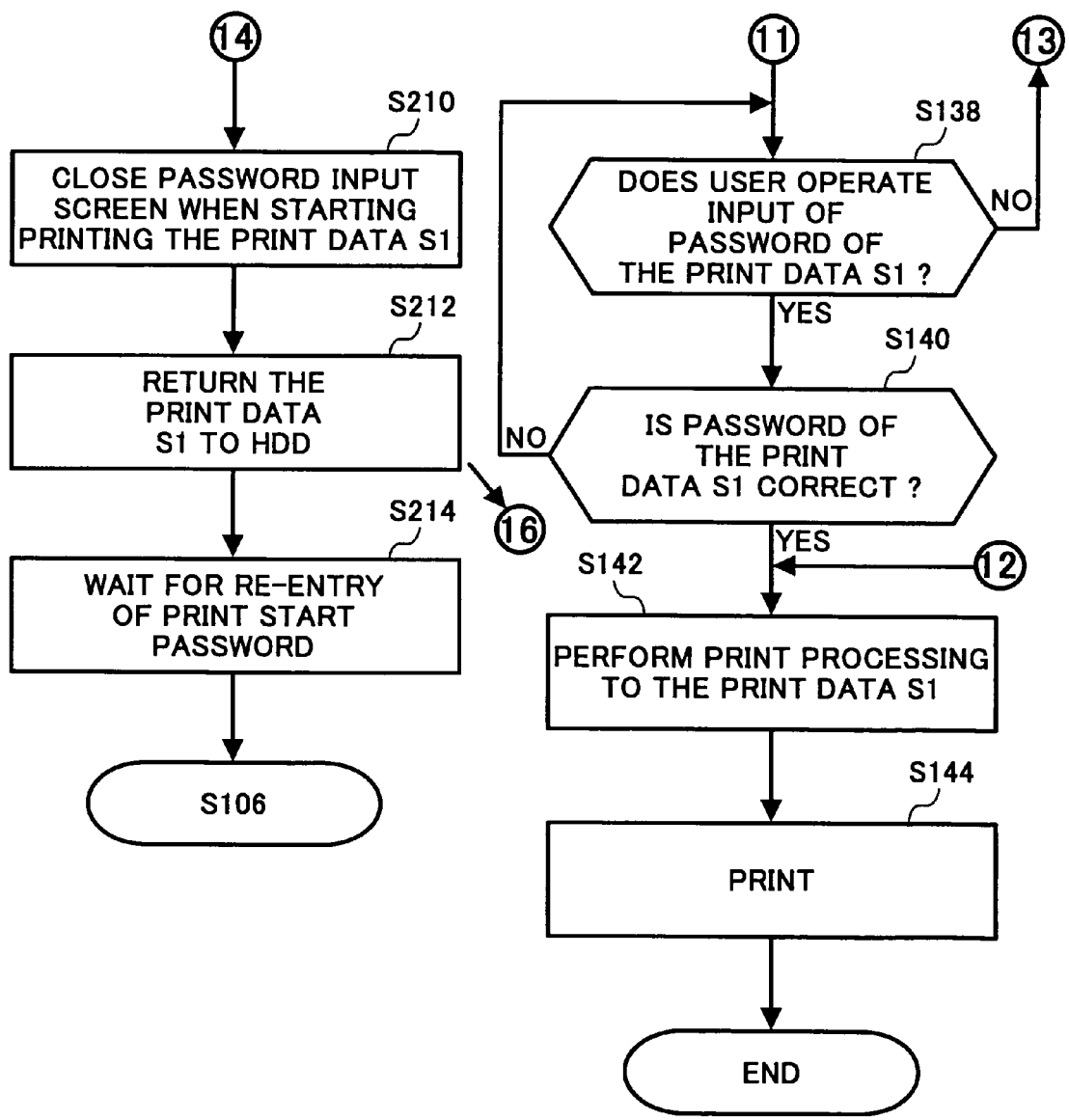
Figure 7C:
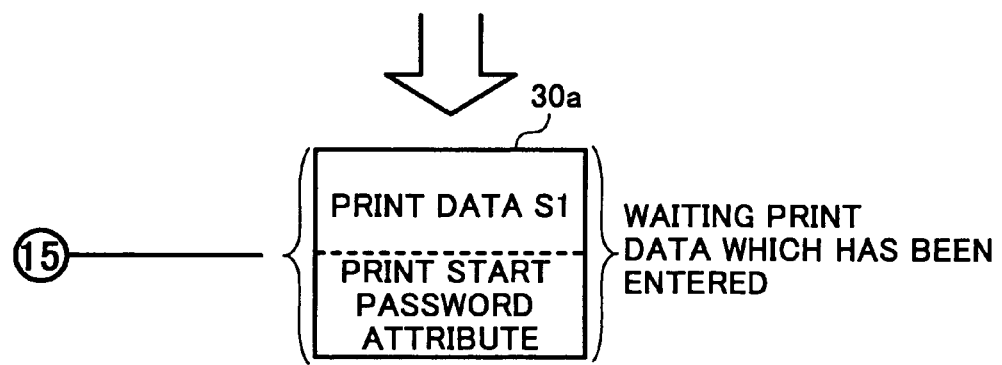
Figure 7C:
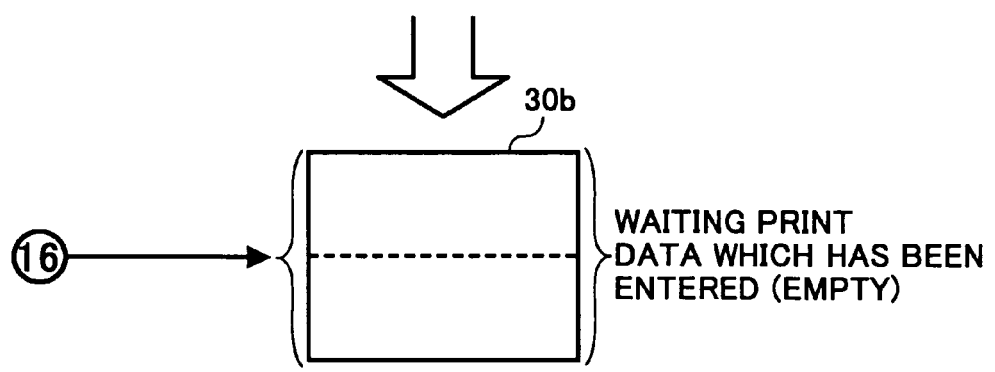
Figure 8A:
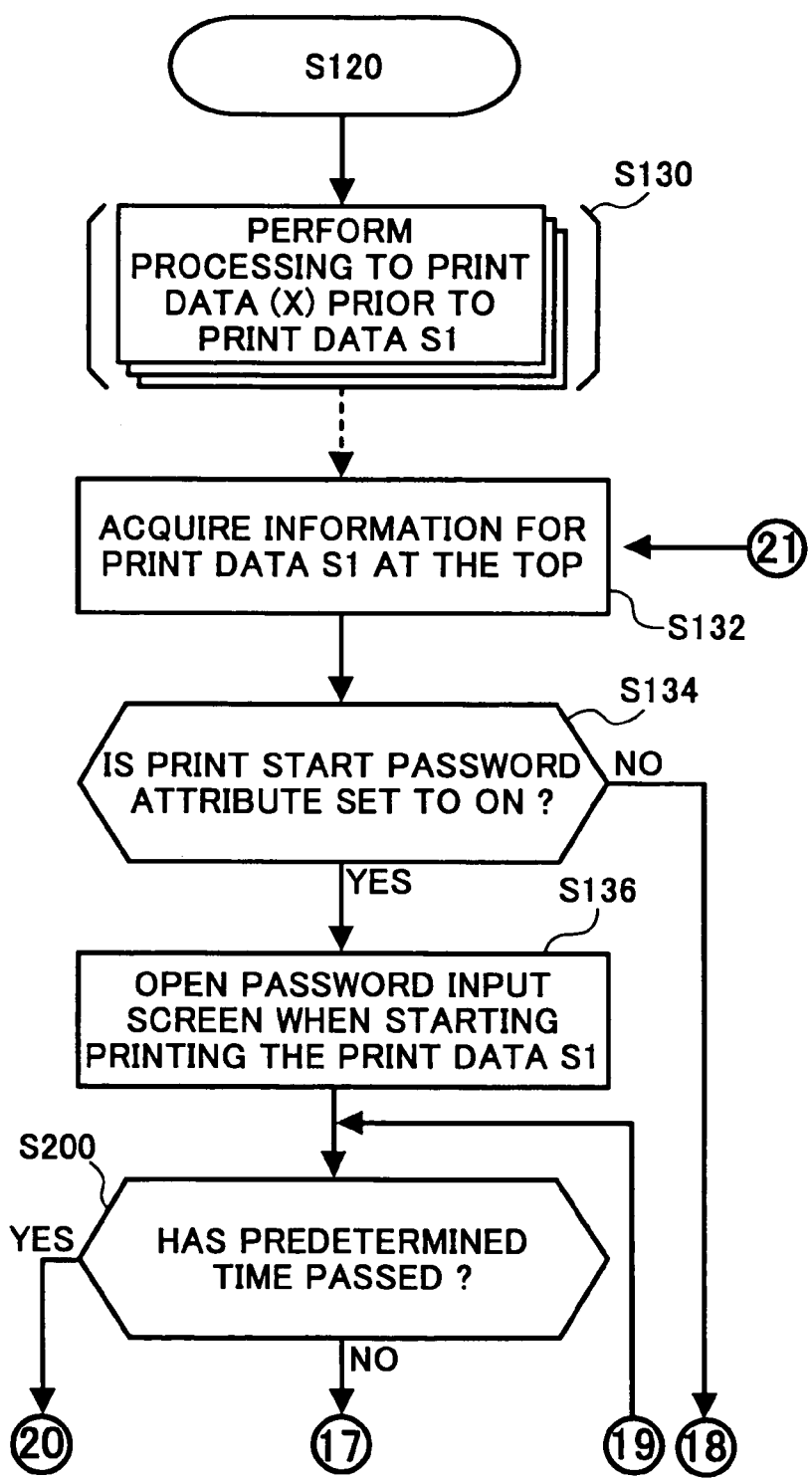
FIG. 8 is a flow chart showing a control flow when a confidential document is printed using a printer 3 according to a fifth embodiment of this invention.
Figure 8B:
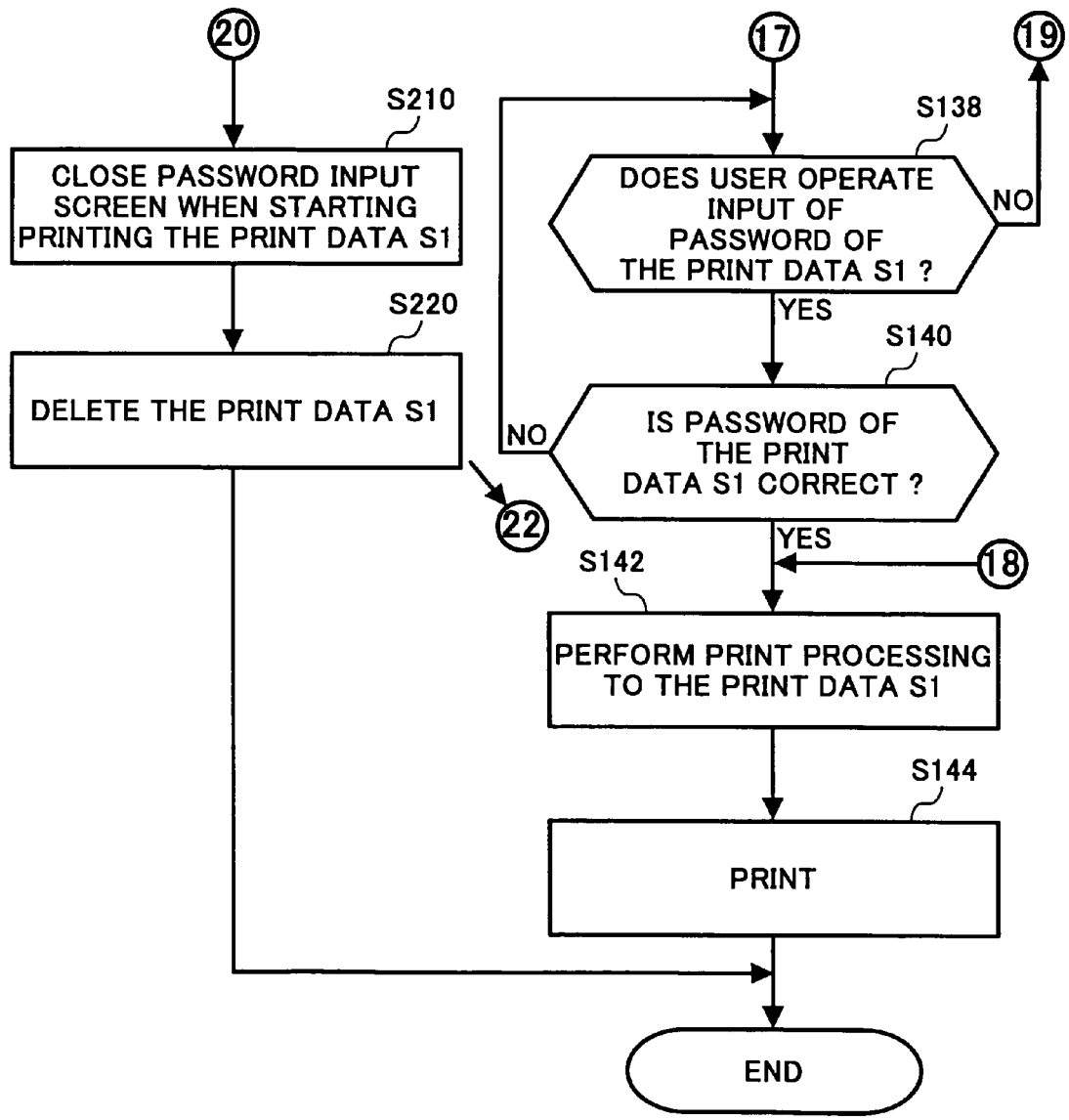
Figure 8C:
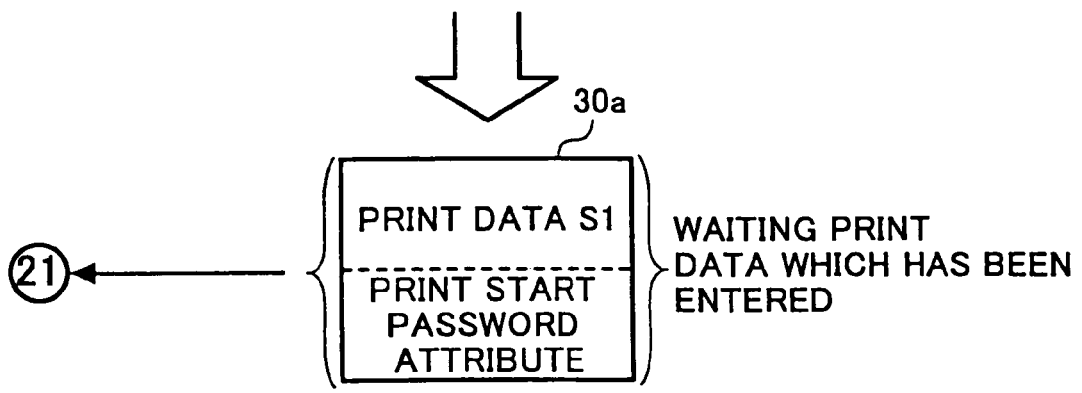
Figure 8C:
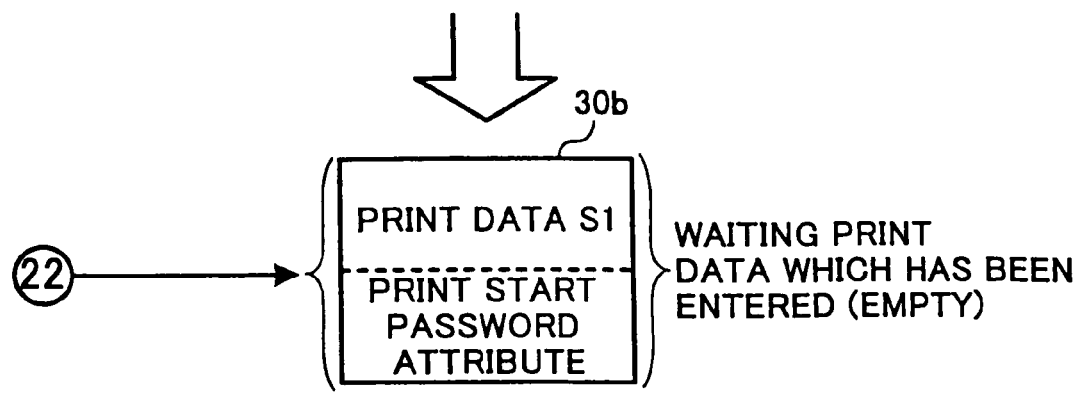

FIG. 6 is a flow chart showing a control flow when a confidential document is printed using a printer 3 according to the third embodiment of this invention. The third embodiment differs from the first and second embodiments in the processing of the printer 3 executed when print data whose print start password attribute is set to ON is entered in the print data FIFO queue section 30.

In FIG. 6, processings denoted by the same step numbers as those shown in FIG. 4 are equal to those at the same step numbers of the printer 3 in the first embodiment, respectively.

The characteristic processing steps of the printer 3 in the third embodiment will be explained below. If the print start password attribute is set to ON (Yes at step S134), the printer 3 in the third embodiment displays the password input screen on the panel 12 (step S136).

When the print data S1 is entered in the print data FIFO queue section 30 and print data B1 is then entered therein in a state of displaying the password input screen on the panel 12 (Yes at step S214), the printing control section 24 acquires information for the print data B1 (step S220). The printing control section 24 refers to the print start password attribute of the print data B1. If the print start password attribute is set to ON (No at step S221), the printing control section 24 returns to a state of waiting for entry of the password of the print data S1 without execution of any processing. Namely, the processing directly jumps to step S138.

On the other hand, if the print start password attribute is set to OFF (Yes at step S221), the printing control section 24 closes the password input screen of the print data S1 (step S222) and replaces the print data S1 by the print data B1 within the print data FIFO queue section 30 (step S223). That is, in the print data FIFO queue section 30, a processing for putting the print data B1 ahead of the print data S1 is performed. The processing returns to step S210. Thereafter, the printing control section 24 acquires information for the print data B1 and refers to the print start password attribute. In this case, the print start password attribute is set to OFF, and therefore the print processing is executed based on the print data B1.

As can be seen, if next print data is entered in the print data FIFO queue section 30 in a state of displaying the entry waiting screen of a print start password, the processing is shifted to the processing for the entered print data. If the print start password attribute thereof is set to OFF, the print data that does not need to input a print start password can be processed prior to the print data S1 that needs to input a print start password. It is, therefore, possible to efficiently utilize hardware resources.

It is noted that the rest of the configuration and the other functions of the printer 3 in the third embodiment are to the same as those of the printer 3 in the first embodiment.

A fourth embodiment of this invention will be explained below.

FIG. 7 is a flow chart showing a control flow when a confidential document is printed using a printer 3 according to a fourth embodiment of this invention. The fourth embodiment differs from the preceding embodiments in the processing of the printer 3 executed when print data whose print start password attribute is set to ON is entered in the print data FIFO queue section 30.

In FIG. 7, processings denoted by the same step numbers as those shown in FIG. 4 are the same as those at the same step numbers of the printer 3 in the first embodiment, respectively.

The characteristic processing steps of the printer 3 in the fourth embodiment will be explained below. If the print start password attribute is set to ON (Yes at step S134), the printer 3 in the fourth embodiment displays the password input screen on the panel 12 (step S136).

If a predetermined time passes in a state in which the print start password of print data to be printed next is not acquired (Yes at step S200), an entry state is canceled and the password input screen for the print data S1 is closed (step S210). The entry section 25 then returns the print data S1, i.e., the print data arranged at the top of the print data FIFO queue section 30 to a state in which the print data S1 is accumulated in the HDD 13 (step S212). The entry section 25 shifts to the state of waiting for reentry, and waits for the entry of the print start password for the print data S1 (step S214).

At this moment, the cancellation of the entry state is transmitted to the host 1 from the printer 3 through the communication cable 2. The host 1 notifies the user of this effect by, for example, displaying the effect on a display. Accordingly, the user can get to know that the entry state has been cancelled by viewing the display of the host 1.

At step S214, the print data S1 is accumulated in the HDD 13. Therefore, if the user inputs the password for the print data S1 again, the processing returns to step S106 explained in the first embodiment with reference to FIG. 3. The print data S1 is reentered in the print data FIFO queue section 30, and the processings at step S108 and the following are executed.

In this way, when a predetermined time passes in a state of waiting for an entry of the print start password for starting print processing of the print data S1 entered in the print data FIFO queue section 30, the print data S1 is returned again from the print data FIFO queue section 30 to the HDD 13. Therefore, even if the user forgets to make an entry of a print start password, it is possible to prevent the print data S1 from being inadvertently printed out. In addition, it is prevented to interrupt the processing for a long time in a state of waiting for an entry of a print start password without execution of any processing, and therefore it is possible to appropriately perform the next print processing without causing the other users to confuse.

On the other hand, if the print start password for the print data S1 is input within the predetermined time, the same processings as those at steps S138 to S144 explained in the first embodiment with reference to FIG. 4, are executed.

It is noted that the rest of the configuration and the other functions of the printer 3 in the fourth embodiment are the same as those of the printer 3 in the first embodiment.

A fifth embodiment of this invention will be explained below.

FIG. 8 is a flow chart showing a control flow when a confidential document is printed using a printer 3 according to the fifth embodiment. The fifth embodiment differs from the preceding embodiments in the processing of the printer 3 executed when print data whose print start password attribute is set to ON is entered in the print data FIFO queue section 30.

In FIG. 8, processings denoted by the same step numbers as those shown in FIG. 4 are equivalent to those at the same step numbers of the printer 3 in the first embodiment, respectively.

The characteristic processing steps of the printer 3 in the fifth embodiment will be explained. When the print start password attribute is set to ON (Yes at step S134), the printer 3 in the fifth embodiment displays the password input screen on the panel 12 (step S136).

If a predetermined time passes while a print start password for print data to be processed next is not acquired (Yes at step S200), the entry state is cancelled and the password input screen for the print data S1 is closed (step S210). The printing control section 24 deletes the print data S1, and finishes the processing to the print data S1 (step S220).

At this moment, the cancellation of the entry state is transmitted to the host 1 from the printer 3 through the communication cable 2. The host 1 notifies the user of this effect by, for example, displaying the effect on the display. Accordingly, the user can get to know that the entry state has been cancelled by viewing the display of the host 1.

In this way, when the predetermined time passes while an entry of a print start password for printing the print data S1 entered in the print data FIFO queue section 30 is kept waiting, the print data S1 is deleted from the entries of the print data FIFO queue section 30. Therefore, even if the user forgets to enter the print start password, it is possible to prevent the print data S1 from being inadvertently printed out. In addition, since it is prevented to interrupt the processing for a long time in a state of waiting for an entry of the print start password, it is possible to appropriately perform the next print processing without causing the other users to confuse.

On the other hand, if the print start password for the print data S1 is input within the predetermined time, the same processings as those at steps S138 to S144 explained in the first embodiment with reference to FIG. 4, are executed.

It is noted that the rest of the configuration and the other functions of the printer 3 in the fifth embodiment are the same as those of the printer 3 in the first embodiment.

A sixth embodiment of this invention will be explained below.

Figure 9A:
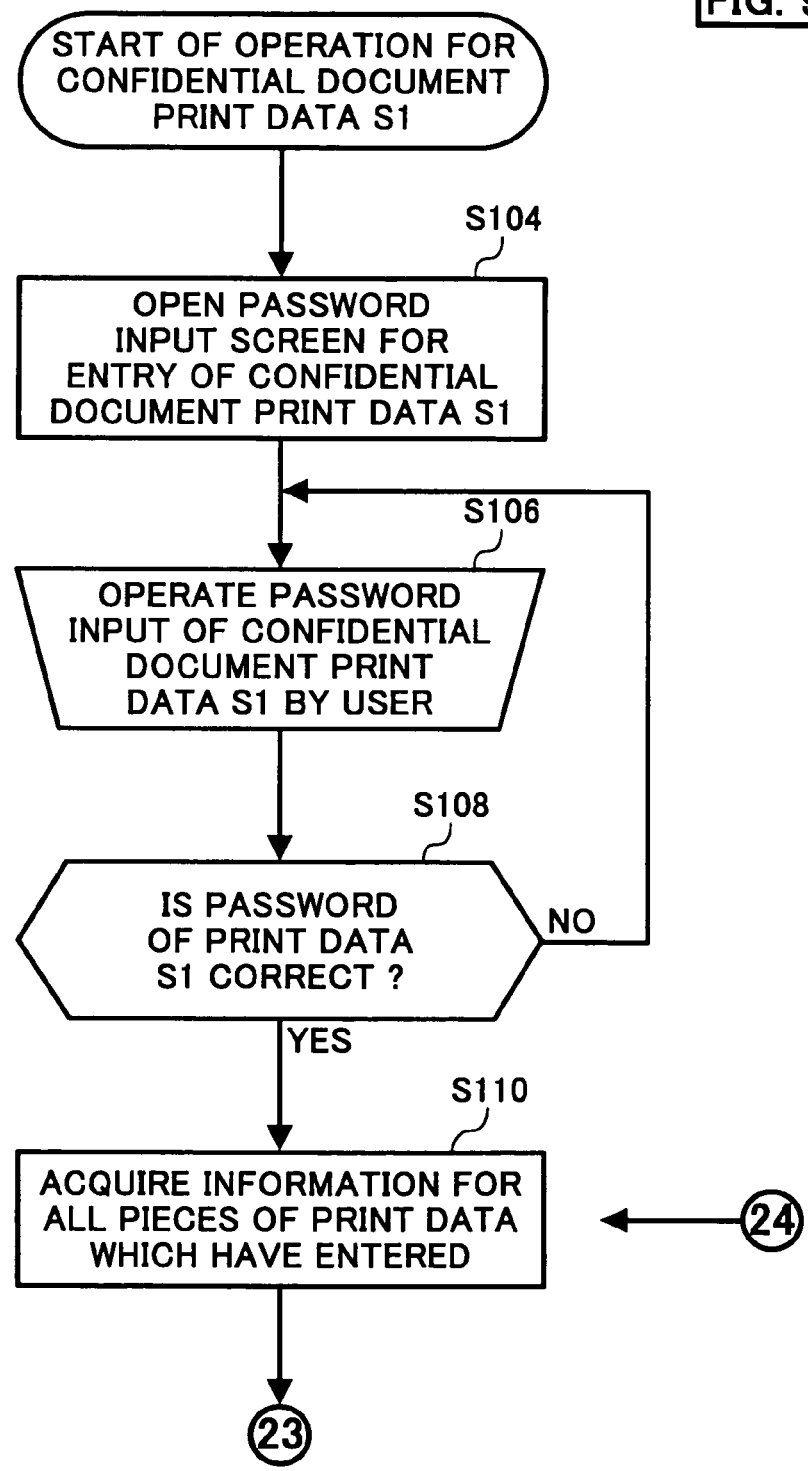
FIG. 9 is a flow chart showing a control flow when a confidential document is printed using a printer 3 according to a sixth embodiment of this invention.
Figure 9B:
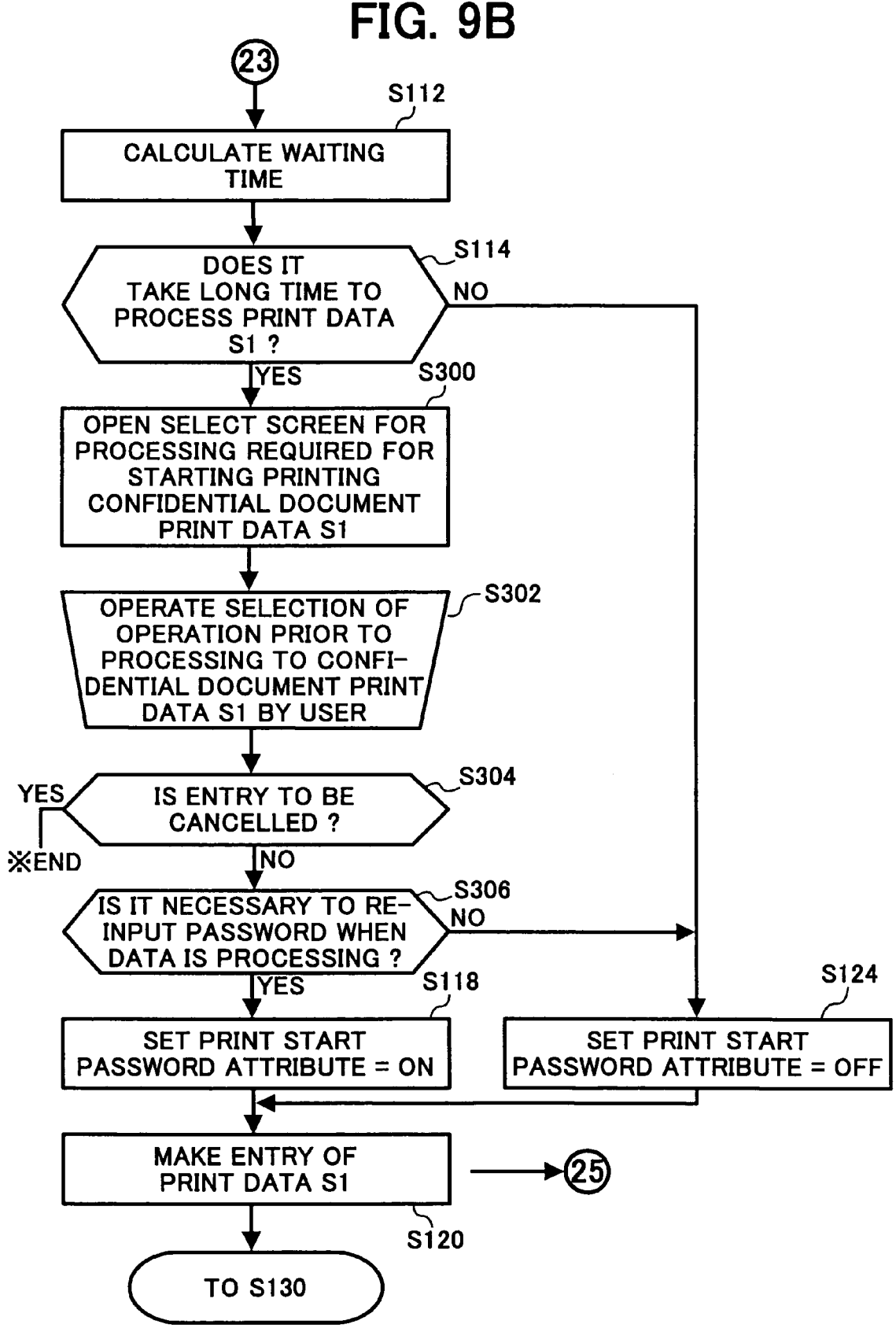
Figure 9C:
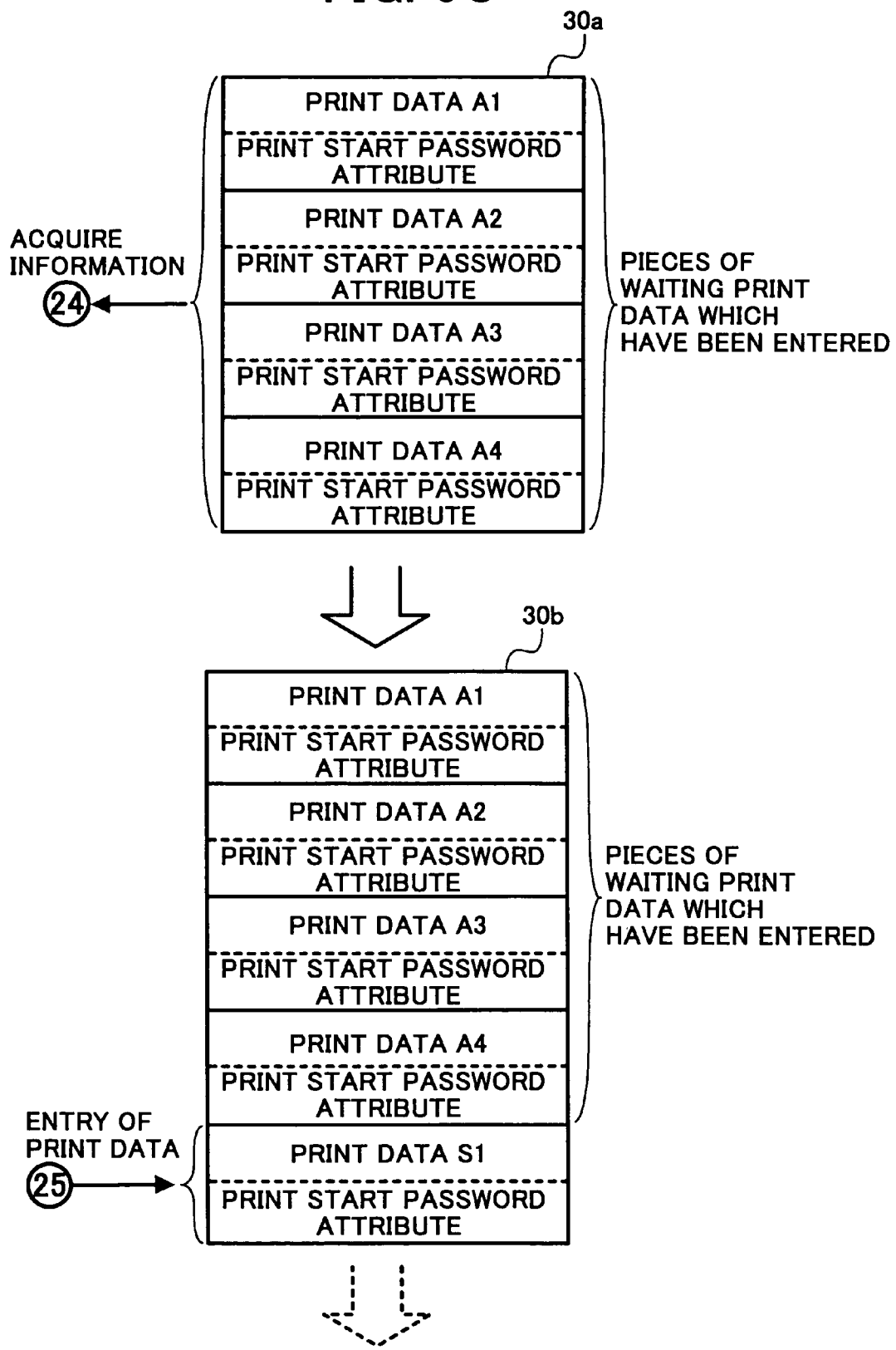

FIG. 9 is a flow chart showing a control flow when a confidential document is printed using a printer 3 according to the sixth embodiment. The sixth embodiment differs from the preceding embodiments in the processing of the printer 3 executed when print data whose print start password attribute is set to ON is entered in the print data FIFO queue section 30.

In FIG. 9, processings denoted by the same step numbers as those shown in FIG. 4 are the same as those at the same step numbers of the printer 3 in the first embodiment, respectively.

The characteristic processing steps of the printer 3 in the sixth embodiment will be explained below. If the print start password attribute is set to ON (Yes at step S134), the printer 3 in the sixth embodiment displays the password input screen on the panel 12 (step S136).

If the waiting time calculated by the time calculation section 26 at step S112 is equal to or longer than the predetermined time (Yes at step S114), the printer displays a select screen for selecting whether to request a print start password when starting the print processing of the print data S1 or to cancel the entry of the print data S1 at that time, on the panel 12 (step S300), and receives the selection from the user through the panel 12 (step S302).

When receiving an instruction for canceling the entry by the selection from the user (Yes at step S304), the printer finishes the processing of the print data S1. In this case, the print data S1 is accumulated in the HDD 13 again.

When receiving an instruction for requesting a print start password again at the time of starting the print processing of the print data S1 (No at step S304, Yes at step S306), the print start password attribute of the print data S1 is set to ON (step S118), and the print data S1 is entered in the print data FIFO queue section 30 (step S120).

If the calculated waiting time is shorter than the threshold of the waiting time (No at step S114), or if receiving an instruction not to request a print start password, the printer 3 sets the print start password attribute to OFF (step S124) and makes an entry of the print data S1 in the print data FIFO queue section 30 (step S120).

As can be seen, the printer 3 according to the sixth embodiment can execute any processing based on the instruction from the user if it takes some time before printing the print data S1.

It is noted that the rest of the configuration and the other functions of the printer 3 in the sixth embodiment are the same as those of the printer 3 in the first embodiment.

As another example of the printer 3 according to the sixth embodiment, a determination criteria as to whether to open a select screen for the processing in starting printing may be made based on the total number of discharged sheets for pieces of print data entered in the print data FIFO queue section 30 prior to the print data S1. In this case, the total number of discharged sheets for the print data A1 to A4 is compared with the total number of discharged sheets set by the user in advance. If the total number of discharged sheets is greater than the number set by the user, the select screen is opened. The total number of discharged sheets may be set through the panel 12.

A seventh embodiment of this invention will be explained below.

Figure 10A:
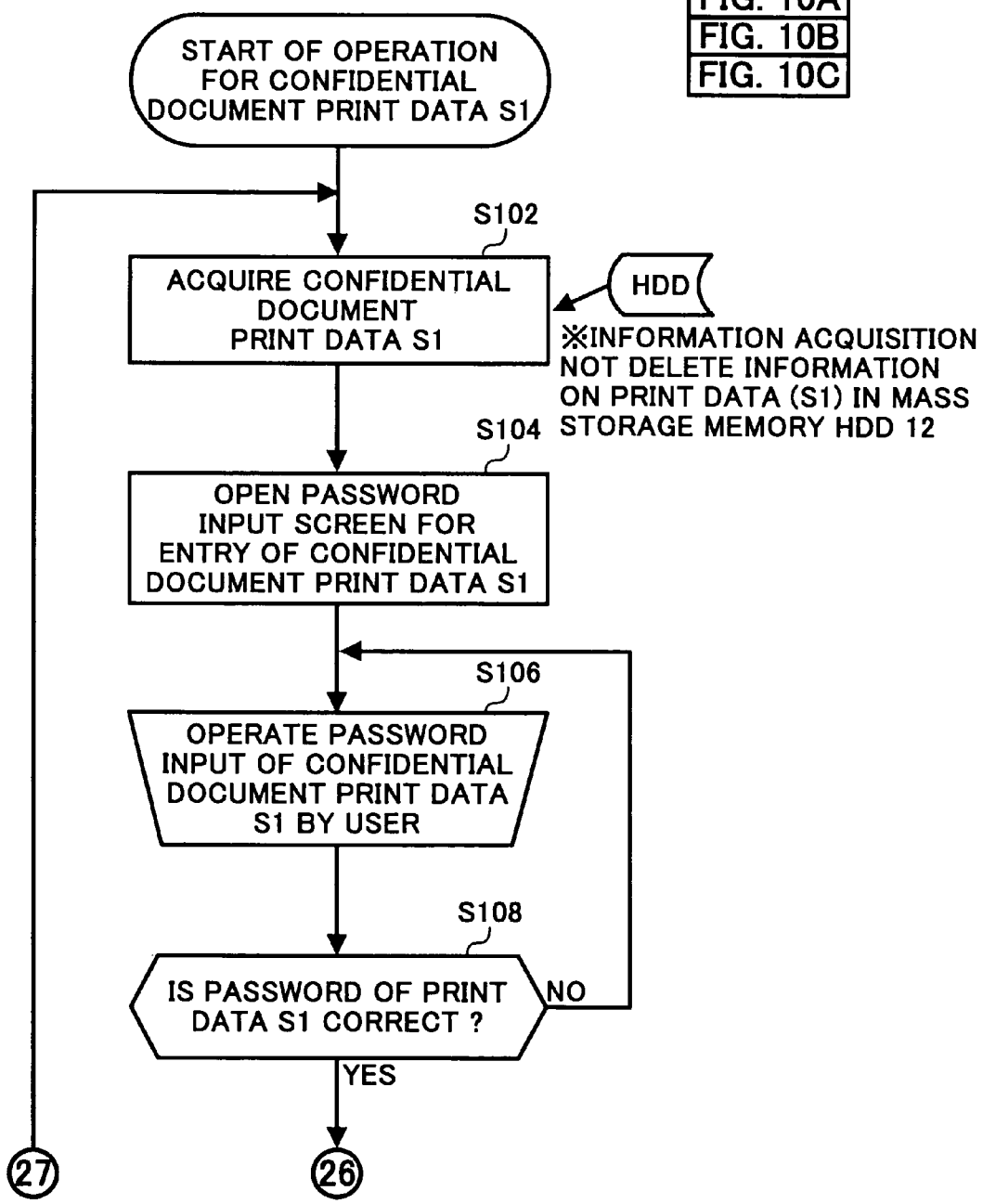
FIG. 10 is a flow chart showing a control flow when a confidential document is printed using a printer 3 according to a seventh embodiment of this invention.
Figure 10B:
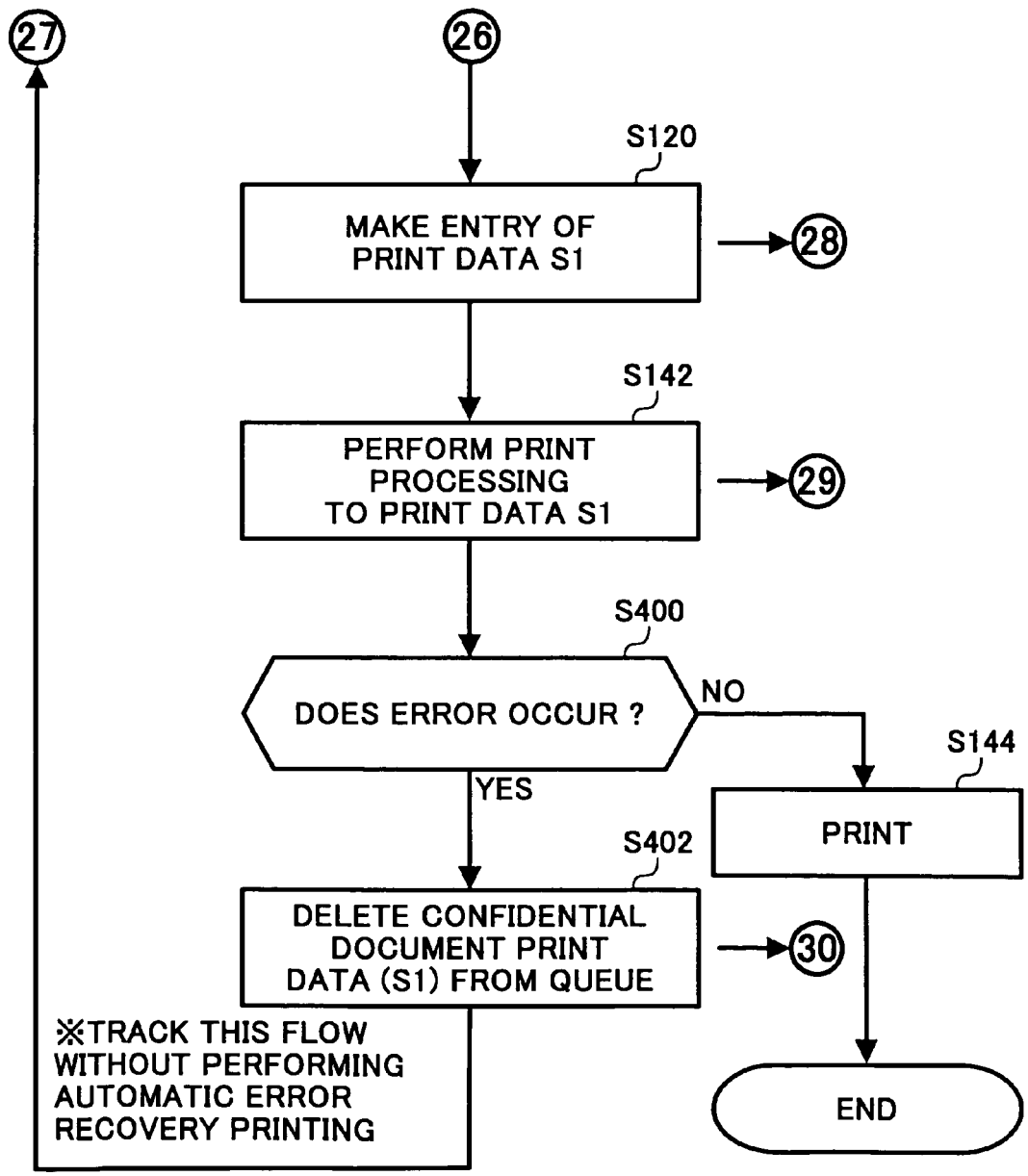
Figure 11B:
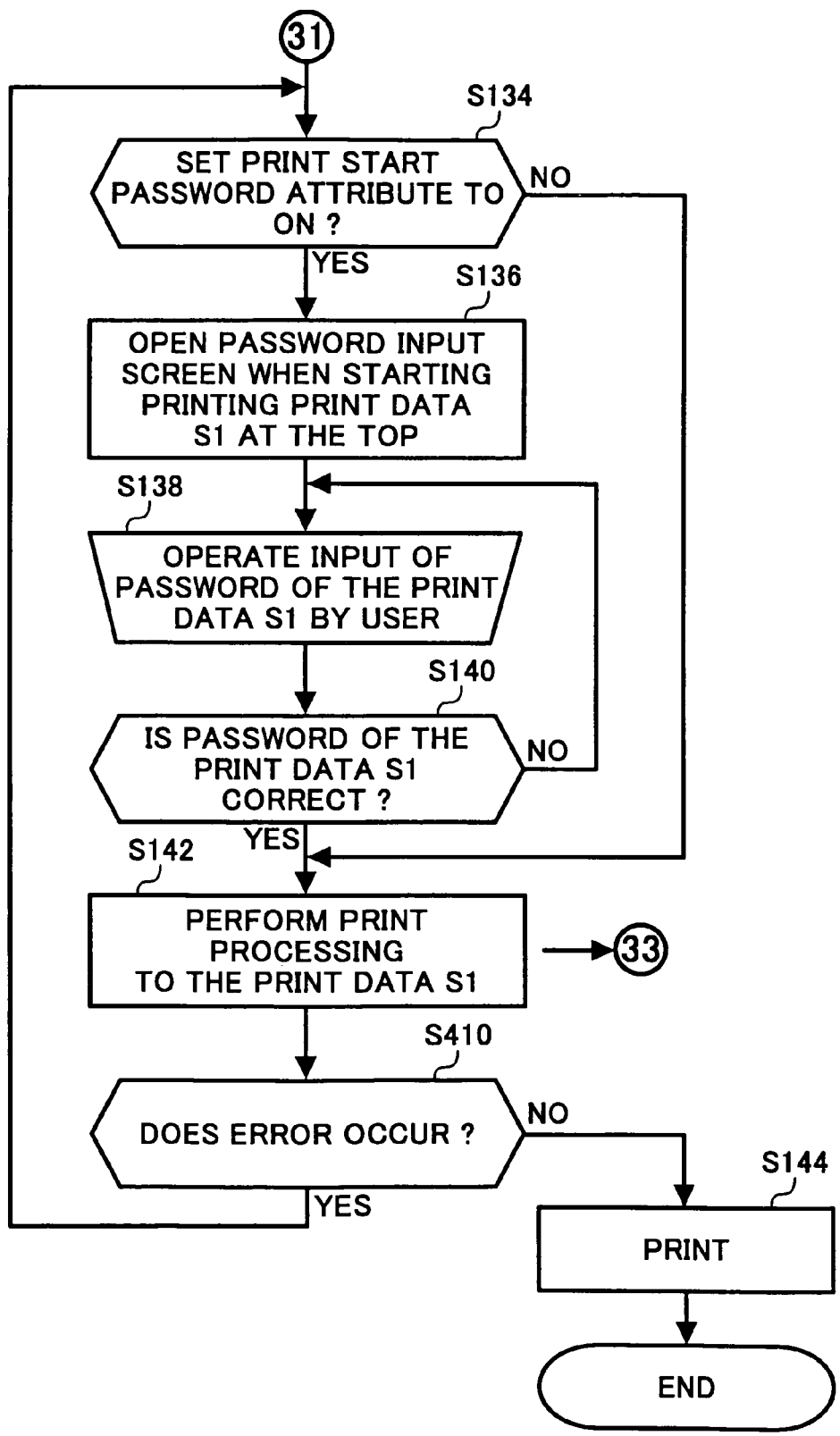
FIG. 11 is a flow chart showing a control flow when a confidential document is printed using a printer 3 according to an eighth embodiment of this invention.
Figure 11C:
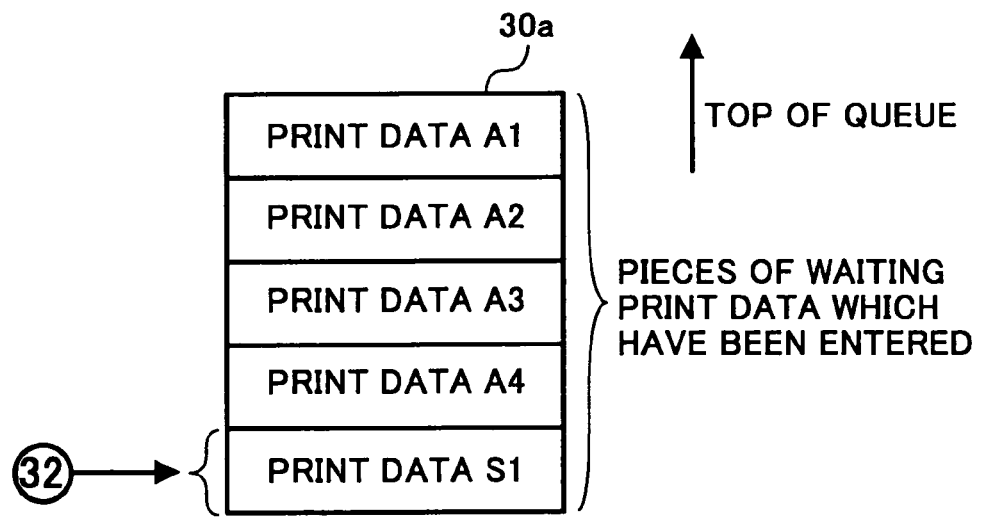
Figure 11C:
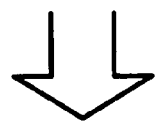
Figure 11C:
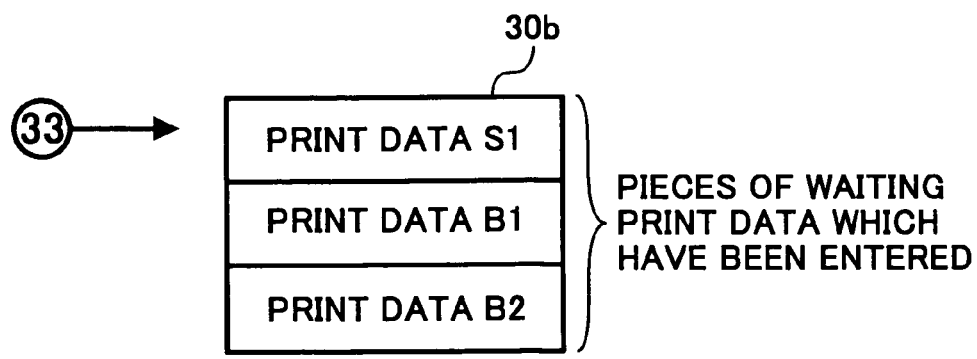

FIG. 10 is a flow chart showing a control flow when a confidential document is printed using a printer 3 according to the seventh embodiment.

In FIG. 10, processings denoted by the same step numbers as those shown in FIG. 4 are the same as those at the same step numbers of the printer 3 in the first embodiment, respectively.

If any error occurs (Yes at step S400) in the middle of conducting the print processing to the print data S1 (step S142), the printer 3 of the seventh embodiment deletes the print data S1 from the print data FIFO queue section 30 (step S402). The error mentioned here means paper jams, shortage of paper, or the like.

As can be seen, so-called error recovery printing is not conducted as seen in the conventional art, but the print data S1 entered in the print data FIFO queue section 30 is deleted. In this case, the print data S1 is stored in the HDD 12, and therefore, if an instruction to print the print data S1 is issued from the user, the print data S1 is entered in the end of the print data FIFO queue section 30 again and the processings from step S102 and then on are executed.

In this way, if any error occurs, the error recovery printing is not executed unconditionally. Therefore, even if an error occurs, it is possible to prevent print data from being inadvertently printed out when the user does not attend. In addition, an entry password needs to be re-entered, and therefore it is possible to hold the confidentiality of the print data.

It is noted that the rest of the configuration and the other functions of the printer 3 in the seventh embodiment are the same as those of the printer 3 in the first embodiment.

An eighth embodiment of this invention will be explained below.

FIG. 11 is a flow chart showing a control flow when a confidential document is printed using a printer 3 according to the eighth embodiment.

In FIG. 11, processings denoted by the same step numbers as those shown in FIGS. 3 and 4 are the same as those at the same step numbers of the printer 3 in the first embodiment, respectively.

If any error occurs (Yes at step S410) in the middle of conducting the print processing to the print data S1 (step S412), and the error is recovered, the printer 3 of the eighth embodiment returns the processing again to step S134 and requests for the print start password again (step S136). Accordingly, it is possible to print out the print data while holding the confidentiality of the print data without changing the array of pieces of the print data entered in the print data FIFO queue section 30.

It is noted that the rest of the configuration and the other functions of the printer 3 in the eighth embodiment are the same as those of the printer 3 in the first embodiment.

A ninth embodiment of this invention will be explained below. A printer 3 in the ninth embodiment will be explained. The printer 3 in the ninth embodiment can cancel the print processing of the print data S1 on the input screen for a print start password after recovery of an error, i.e., at step S138 explained in the eighth embodiment with reference to FIG. 11. If receiving an instruction for canceling the print processing from the user through the panel 12, then the printer 3 stops the processing of the print data S1, deletes the print data from the HDD 12, and finishes the processing of the print data S1. Thus, it is possible to execute any processing to meet the needs of the user.

It is noted that the rest of the configuration and the other functions of the printer 3 in the ninth embodiment are the same as those of the printer 3 in the eighth embodiment.

The present invention has been explained so far while referring to the embodiments. However, various changes or modifications can be made to the embodiments. As one modification, addresses of the print data may be entered in the print data FIFO queue section 30 instead of the print data itself as explained in the embodiments.

As explained so far, according to the one aspect of the invention, the print processing to the print data is started under condition that the password is acquired. Therefore, it is possible to hold the confidentiality of the print data. In addition, there is no need for the user to attend near the image formation apparatus until the print data is printed out. That is, it is advantageously possible to improve the convenience of the image formation apparatus.

Moreover, even if the print data is managed by the print data FIFO queue, the acquisition of the password can be set as a condition for starting the print processing. Therefore, there is no need for the user to attend near the image formation apparatus until the print data is printed out.

Furthermore, the printing unit is allowed to start the print processing of the print data under condition that the password for the print data is acquired if the condition reception unit receives the designation to require acquisition of the password for the print data. Therefore, there is no need for the user to attend near the image formation apparatus until the print data is printed out. Conversely, if the print data is one for any document that may be automatically printed unlike a confidential document, the user does not need to input a password unless designation is given to the effect that it is necessary to acquire the password of the print data. Thus, It is possible to execute any processing that meets the needs of the user. Namely, it is advantageously possible to improve the convenience of the image formation apparatus.

Moreover, if pieces of print data to which the image formation apparatus is to conduct print processing, are already waiting, the user does not need to wait for the printing near the image formation apparatus until the print data transmitted by the user is printed out. Namely, it is advantageously possible to improve the convenience of the image formation apparatus.

Furthermore, the waiting time for specified print data is calculated based on the number of sheets to which the print data entered in the print data FIFO queue prior to the target specified print data, is to be output. It is, therefore, possible to calculate a value close to an actual waiting time. Therefore, it is advantageously possible to improve the reliability of the image formation apparatus.

Moreover, the waiting time for specified print data is calculated based on the number of jobs of the print data entered in the print data FIFO queue prior to the specified print data as a target. It is, therefore, possible to calculate a value close to an actual waiting time. Thus, it is advantageously possible to improve the reliability of the image formation apparatus.

Furthermore, the waiting time for specified print data is calculated based on a data amount of the print data entered in the print data FIFO queue prior to the specified print data as a target. It is, therefore, possible to calculate a value close to an actual waiting time. Thus, it is advantageously possible to improve the reliability of the image formation apparatus.

Moreover, the waiting time for specified print data is calculated based on a size of a sheet to which the print data entered in the print data FIFO queue prior to the target specified print data, is to be output. It is, therefore, possible to calculate a value close to an actual waiting time. Thus, it is advantageously possible to improve the reliability of the image formation apparatus.

Furthermore, the user can freely set the threshold of the waiting time, based on which it is determined whether to start the processing of the print data, i.e., whether it is necessary to input a password under condition that the password for the print data is acquired if the waiting time calculated by the time calculation unit exceeds the threshold of the waiting time received by the threshold reception unit. Therefore, it is advantageously possible to improve the convenience of the image formation apparatus.

Moreover, it is possible to determine whether a password is requested as a condition for starting the print processing in accordance with an actual passage time. Therefore, it suffices that the user inputs the password only if the predetermined time passes before the print processing to the print data is actually started. If the print data is output in relatively short time, it is unnecessary to input the password. Thus, it is advantageously possible to improve the convenience of the image formation apparatus.

Furthermore, if a password for print data to e printed next is not acquired, the print processing of print data entered next to the print data can be performed first. Thus, it is advantageously possible to improve the convenience of the image formation apparatus.

Moreover, if a predetermined time passes while a password for print data to be printed next is not acquired, the print data is deleted. Therefore, it is advantageously possible to prevent the print data from being inadvertently printed out and to secure the confidentiality of the print data.

Furthermore, if a predetermined time passes while a password for print data to be printed next is not acquired, the print data positioned at the top of the print data FIFO queue is returned to the print data storage unit. Therefore, it is advantageously possible to prevent the print data from being inadvertently printed out and to secure the confidentiality of the print data.

Moreover, if an error occurs in the print processing, the print processing of the print data is started under condition that the password already acquired by the password acquisition unit is invalidated and that the printing unit acquires the password for the print data after recovery of the error. Therefore, it is advantageously possible to prevent the print data for a confidential document from being inadvertently printed out by error recovery printing as seen in the conventional art.

Furthermore, if an error occurs in the print processing, the print data arranged at the top of the print data FIFO queue is returned to the print data storage unit. Therefore, it is advantageously possible to prevent the print data for a confidential document from being inadvertently printed out by error recovery printing as seen in the conventional art.

Moreover, if the cancellation reception unit receives the designation to cancel the print processing of the print data, the print data can be deleted from the print data FIFO queue. That is, if an error occurs, the user can freely set whether to delete the print data from the print data FIFO queue. Thus, it is advantageously possible to improve the convenience of the image formation apparatus.

According to still another aspect of this invention, the print processing of the print data is started under condition that the password is acquired. Therefore, it is advantageously possible to secure the confidentiality of the print data.

The present document incorporates by reference the entire contents of Japanese priority documents, 2001-351715 filed in Japan on Nov. 16, 2001 and 2002-108397 filed in Japan on Apr. 10, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image formation apparatus comprising:
   a print data storage unit that stores print data and a first password;
   a printing unit that conducts print processing to the print data stored in the print data storage unit;
   a password acquisition unit that acquires an entry password for the print data from an outside of the apparatus; and
   a printing control unit that allows the printing unit to start the print processing of the print data under condition that the entry password acquired by the password acquisition unit corresponds to the first password;
   a print data queue that stores the print data to be processed by the printing unit;
   an entry unit that makes an entry of the print data stored in the print data storage unit, in the print data queue; and
   an output control unit that outputs an instruction for a request of the password for the print data stored at a top of the print data queue; and
   a time calculation unit that calculates a waiting time required since the entry unit makes an entry of the print data in the print data queue until the printing unit starts the print processing of the print data, wherein
   the time calculation unit calculates a waiting time for a specified print data based on a number of sheets to which the print data is output, the print data being entered in the print data queue prior to the specified print data among the print data stored in the print data queue.

2. An image formation apparatus comprising:
   a print data storage unit that stores print data and a first password;
   a printing unit that conducts print processing to the print data stored in the print data storage unit;
   a password acquisition unit that acquires an entry password for the print data from an outside of the apparatus; and
   a printing control unit that allows the printing unit to start the print processing of the print data under condition that the entry password acquired by the password acquisition unit corresponds to the first password;
   a print data queue that stores the print data to be processed by the printing unit;
   an entry unit that makes an entry of the print data stored in the print data storage unit, in the print data queue; and
   an output control unit that outputs an instruction for a request of the password for the print data stored at a top of the print data queue; and
   a time calculation unit that calculates a waiting time required since the entry unit makes an entry of the print data in the print data queue until the printing unit starts the print processing of the print data, wherein the printing control unit allows the printing unit to start the print processing of the print data first entered in the print data queue under condition that the output control unit acquires the password for the print data stored at the top of the print data queue, the printing control unit allows the printing unit to start the print processing of the print data under condition that the password for the print data is acquired if the waiting time is equal to or longer than a predetermined time, and the time calculation unit calculates the waiting time for a specified print data based on a number of jobs of the print data entered in the print data queue prior to the specified print data among the print data stored in the print data queue.

3. An image formation apparatus comprising:

a print data storage unit that stores print data and a first password;

a print unit that conducts print processing to the print data stored in the print data storage unit;

a password acquisition unit that acquires an entry password for the print data from an outside of the apparatus; and a printing control unit that allows the printing unit to start the print processing of the print data under condition that the entry password acquired by the password acquisition unit corresponds to the first password;

a print data queue that stores the print data to be processed by the printing unit;

an entry unit that makes an entry of the print data stored in the print data storage unit, in the print data queue; and an output control unit that outputs an instruction for a request of the password for the print data stored at a top of the print data queue; and a time calculation unit that calculates a waiting time required since the entry unit makes an entry of the print data in the print data queue until the printing unit starts the print processing of the print data, wherein the printing control unit allows the printing unit to start the print processing of the print data first entered in the print data queue under condition that the output control unit acquires the password for the print data stored at the top of the print data queue, the printing control unit allows the minting unit to start the print processing of the print data under condition that the password for the print data is acquired if the waiting time is equal to or longer than a predetermined time, and the time calculation unit calculates the waiting time for a specified print data based on a data amount of the print data entered in the print data queue prior to the specified print data among the print data stored in the print data queue.

4. An image formation apparatus comprising:

a print data storage unit that stores print data and a first password;

a printing unit that conducts print processing to the print data stored in the print data storage unit;

a password acquisition unit that acquires an entry password for the print data from an outside of the apparatus; and a printing control unit that allows the printing unit to start the print processing of the print data under condition that the entry password acquired by the password acquisition unit corresponds to the first password;

a print data queue that stores the print data to be processed by the printing unit;

an entry unit that makes an entry of the print data stored in the print data storage unit, in the print data queue; and an output control unit that outputs an instruction for a request of the password for the print data stored at a top of the print data queue; and a time calculation unit that calculates a waiting time required since the entry unit makes an entry of the print data in the print data queue until the printing unit starts the print processing of the print data, wherein the printing control unit allows the printing unit to start the print processing of the print data first entered in the print data queue under condition that the output control unit acquires the password for the print data stored at the top of the print data queue, the printing control unit allows the printing unit to start the print processing of the print data under condition that the password for the print data is acquired if the waiting time is equal to or longer than a predetermined time, and the time calculation unit calculates the waiting time for a specified print data based on a size of a sheet to which the print data is output, the print data being entered in the print data queue prior to the specified print data among the print data stored in the print data queue.

5. An image formation apparatus comprising:

a print data storage unit that stores print data and a first password;

a printing unit that conducts print processing to the print data stored in the print data storage unit;

a password acquisition unit that acquires an entry password for the print data from an outside of the apparatus; and a printing control unit that allows the printing unit to start the print processing of the print data under condition that the entry password acquired by the password acquisition unit corresponds to the first password;

a print data queue that stores the print data to be processed by the printing unit;

an entry unit that makes an entry of the print data stored in the print data storage unit, in the print data queue; and an output control unit that outputs an instruction for a request of the password for the print data stored at a top of the print data queue; and a time calculation unit that calculates a waiting time required since the entry unit makes an entry of the print data in the print data queue until the printing unit starts the print processing of the print data; and a threshold reception unit that receives designation of a threshold of the waiting time, wherein the printing control unit allows the printing unit to start the print processing of the print data first entered in the print data queue under condition that the output control unit acquires the password for the print data stored at the top of the print data queue, the printing control unit allows the printing unit to start the print processing of the print data under condition that the password for the print data is acquired if the waiting time is equal to or longer than a predetermined time, and the printing control unit allows the printing unit to start the print processing of the print data under condition that the password for the print data is acquired if the waiting time calculated by the time calculation unit exceeds the threshold of the waiting time received by the threshold reception unit.

6. An image formation apparatus comprising:
a print data storage unit that stores print data and a first password;
a printing unit that conducts print processing to the print data stored in the print data storage unit;
a password acquisition unit that acquires an entry password for the print data from an outside of the apparatus;
a printing control unit that allows the printing unit to start the print processing of the print data under condition that the entry password acquired by the password acquisition unit corresponds to the first password;
a print data queue that stores the print data to be processed by the printing unit;
an entry unit that makes an entry of the print data stored in the print data storage unit, in the print data queue;
an output control unit that outputs an instruction far a request of the password for the print data stored at a top of the print data queue; and
a time measurement unit that measures an actual passage time required since the print data is entered in the print data queue until the print data reaches the top of the print data queue, wherein
the printing control unit allows the printing unit to start the print processing of the print data first entered in the print data queue under condition tat the output control unit acquires the password for the print data stored at the top of the print data queue, and
the printing control unit allows the printing unit to start the print processing of the print data under condition that the password for the print data is acquired if the time measured by the time measurement unit is equal to or longer than the predetermined time.

7. The image formation apparatus according to claim 6, wherein
the printing control unit allows the printing unit to start the print processing of the other print data, if the predetermined time passes while the printing unit does not acquire the password for print data to be printed next, under condition that a password for the other print data entered next to the print data in the print data queue is acquired.

8. The image formation apparatus according to claim 6, further comprising:
a print data deletion unit that deletes print data if the predetermined time passes while the password for the print data to be printed next is not acquired.

9. The image formation apparatus according to claim 6, wherein
the entry unit returns print data positioned at the top of the print data queue, to the print data storage unit if the predetermined time passes while the password forte print data to be printed next is not acquired.

10. The image formation apparatus according to claim 6, wherein
the printing control unit allows the printing unit to start the print processing of the print data under condition tat the password already acquired by the password acquisition unit is invalidated if an error occurs in the print processing of the priming unit and that the printing unit acquires the password for the print data after recovery from the error.

11. The image formation apparatus according to claim 6, wherein
the entry unit returns at least the print data as an entry at the top of the print data queue, among the print data entered in the print data queue, to the print data storage unit if an error occurs in the print processing of the printing unit.

12. The image formation apparatus according to claim 6, further comprising:
a cancellation reception unit that receives designation to cancel the print processing of at least the print data as an entry at the top of the print data queue, among the print data stored in the print data queue, if an error occurs in the print processing of the printing unit, wherein
when receiving the designation to cancel the print processing of the print data, the cancellation reception unit deletes the print data from the print data queue.

13. An image formation method comprising steps of:
(a) receiving and storing print data and a first password in a print data storage unit;
(b) entering in a print data queue the stored print data to be processed by a printing unit;
(c) measuring actual passage time required since the print data is entered in the print data queue until the print data reaches the top of the print data queue;
(d) outputting an instruction for a request of the password for the print data stored at a top of the print data queue;
(e) acquiring an entry password for the print data from an outside;
(f) measuring an actual passage time required since the print data is entered in the print data queue until the print data reaches the top of the print data queue; and
(g) starting print processing of the print data received in step (a) under condition that the entry password for the print data acquired in step (e) corresponds to the first password received in step (a) and that the actual passage time measured in step (f) is equal to or longer than a predetermined time.

* * * * *